United States Patent
Abbondanzio

(10) Patent No.: US 12,260,378 B2
(45) Date of Patent: Mar. 25, 2025

(54) APPARATUS, SYSTEM, AND METHOD FOR GENERATING INTERNET OF THINGS-BASED NOTIFICATIONS AND RECORDS

(71) Applicant: Dallas/Fort Worth International Airport Board, Dallas, TX (US)

(72) Inventor: Matthew L. Abbondanzio, Dallas, TX (US)

(73) Assignee: Dallas/Fort Worth International Airport Board, Dallas, TX (US)

( * ) Notice: Subject to any disclaimer, the term of this patent is extended or adjusted under 35 U.S.C. 154(b) by 468 days.

(21) Appl. No.: 17/373,481

(22) Filed: Jul. 12, 2021

(65) Prior Publication Data

US 2023/0011326 A1    Jan. 12, 2023

(51) Int. Cl.
*G06Q 10/20*    (2023.01)
*G06Q 10/30*    (2023.01)

(52) U.S. Cl.
CPC ............. *G06Q 10/20* (2013.01); *G06Q 10/30* (2013.01)

(58) Field of Classification Search
CPC ........ G06Q 10/20; G06Q 10/30; G06Q 10/08; G06Q 10/0833; G06Q 50/10; G06Q 10/00
See application file for complete search history.

(56) References Cited

U.S. PATENT DOCUMENTS

| | | | |
|---|---|---|---|
| 7,999,688 B2 | 8/2011 | Healey et al. | |
| 9,342,884 B2 | 5/2016 | Mask | |
| 9,582,977 B2 | 2/2017 | Cowley et al. | |
| 9,691,256 B2 | 6/2017 | Wu et al. | |

(Continued)

FOREIGN PATENT DOCUMENTS

| CA | 3033436 A1 | 9/2019 |
|---|---|---|
| CA | 3073639 A1 | 9/2019 |

(Continued)

OTHER PUBLICATIONS

Paul, S., Banerjee, S., & Biswas, S. (Nov. 2018). Smart garbage monitoring using IoT. In 2018 IEEE 9th Annual Information Technology, Electronics and Mobile Communication Conference (IEMCON) (pp. 1181-1185). IEEE. (Year: 2018).*

(Continued)

*Primary Examiner* — John S. Wasaff

(57) ABSTRACT

A method executed by an electronic device includes receiving measurements from one or more one sensor systems, wherein each of the sensor systems measures characteristic variables of a respective space located proximate to the sensor system and is removably attached to a bin that defines the respective space. The method includes determining, for each of the respective spaces, whether a measured characteristic variable of the respective space satisfies one or more conditions for generating a maintenance request. For each of the respective spaces, the method includes: in response to determining a condition, from among the one or more conditions for generating a maintenance request, is satisfied by a measured characteristic variable of the respective space, generating the maintenance request in association with an identifier of the sensor system. For each of the respective spaces, the method includes: transmitting a message to a mobile device, the message including the maintenance request.

19 Claims, 13 Drawing Sheets

(56) References Cited

U.S. PATENT DOCUMENTS

| | | | |
|---|---|---|---|
| 9,721,342 B2 | 8/2017 | Mask | |
| 9,796,526 B2 | 10/2017 | Smith et al. | |
| 10,035,647 B1 | 7/2018 | Rodoni | |
| 10,152,737 B2 | 12/2018 | Lyman | |
| 10,203,237 B2 | 2/2019 | Gwon et al. | |
| 10,217,366 B2 | 2/2019 | Cronin et al. | |
| 10,481,607 B2 | 11/2019 | Dumitras | |
| 10,948,329 B2 | 3/2021 | Moeller | |
| 11,488,118 B1* | 11/2022 | Patel | G06Q 10/30 |
| 2007/0268759 A1* | 11/2007 | Sabino | B65F 1/1484 |
| | | | 365/192 |
| 2008/0198021 A1* | 8/2008 | Flood | B30B 9/3042 |
| | | | 220/200 |
| 2010/0071572 A1* | 3/2010 | Carroll | B30B 9/3007 |
| | | | 100/229 A |
| 2010/0179912 A1 | 7/2010 | Curotto | |
| 2014/0172174 A1* | 6/2014 | Poss | B65F 1/1426 |
| | | | 700/275 |
| 2014/0379588 A1* | 12/2014 | Gates | G06Q 10/0631 |
| | | | 705/308 |
| 2015/0348252 A1* | 12/2015 | Mask | G06T 7/001 |
| | | | 382/103 |
| 2016/0176630 A1* | 6/2016 | Shahabdeen | B65F 1/00 |
| | | | 206/459.1 |
| 2016/0354990 A1* | 12/2016 | Skocypec | B65F 1/14 |
| 2016/0379468 A1* | 12/2016 | Wu | G01N 33/0001 |
| | | | 340/632 |
| 2019/0019167 A1* | 1/2019 | Candel | B65F 3/14 |
| 2019/0064004 A1 | 2/2019 | Brady et al. | |
| 2019/0270585 A1 | 9/2019 | Moore | |
| 2019/0271578 A1 | 9/2019 | Moeller | |
| 2019/0339112 A1 | 11/2019 | Balachandran et al. | |
| 2019/0382198 A1* | 12/2019 | Qiu | G08B 21/18 |
| 2020/0189844 A1 | 6/2020 | Sridhar | |
| 2020/0191580 A1* | 6/2020 | Christensen | G06Q 10/30 |
| 2020/0331695 A1 | 10/2020 | Ron et al. | |
| 2020/0346852 A1 | 11/2020 | Hess et al. | |
| 2020/0355536 A1 | 11/2020 | Welle et al. | |
| 2020/0359210 A1* | 11/2020 | Akkad | H04W 12/35 |
| 2020/0391940 A1 | 12/2020 | Wang et al. | |
| 2021/0012605 A1* | 1/2021 | Yamine | B65F 1/1484 |
| 2021/0035146 A1* | 2/2021 | Odom | G06Q 30/0226 |
| 2021/0188541 A1* | 6/2021 | Kurani | B65F 1/14 |
| 2021/0216975 A1* | 7/2021 | Haddouch | G06Q 50/26 |
| 2021/0217156 A1* | 7/2021 | Balachandran | G06T 7/0008 |
| 2022/0051388 A1* | 2/2022 | Liu | G06T 7/0004 |
| 2022/0161995 A1* | 5/2022 | Li | B65F 1/062 |
| 2023/0331472 A1* | 10/2023 | Zhu | B65F 1/16 |

FOREIGN PATENT DOCUMENTS

| | | |
|---|---|---|
| CA | 3072664 A1 | 2/2020 |
| CN | 107000435 A | 8/2017 |
| WO | 2019130302 A1 | 7/2019 |
| WO | 2020223008 A1 | 11/2020 |

OTHER PUBLICATIONS

Anitha, A. (Nov. 2017). Garbage monitoring system using IoT. In IOP Conference Series: Materials Science and Engineering (vol. 263, No. 4, p. 042027). IOP Publishing. (Year: 2017).*

AlMashari, R., AlJurbua, G., AlHoshan, L., Al Saud, N. S., BinSaeed, O., & Nasser, N. (Nov. 2018). IoT-based smart airport solution. In 2018 International Conference on Smart Communications and Networking (SmartNets) (pp. 1-6). IEEE. (Year: 2018).*

Paavan, L. C. S., Sai, T. G., & Naga, M. K. (Apr. 2019). An IoT based smart garbage alert system. In 2019 3rd International Conference on Trends in Electronics and Informatics (ICOEI) (pp. 425-430). IEEE. (Year: 2019).*

International Search Report and Written Opinion of the International Searching Authority dated Sep. 12, 2022, in connection with International Application No. PCT/US2022/036375, 14 pages.

* cited by examiner

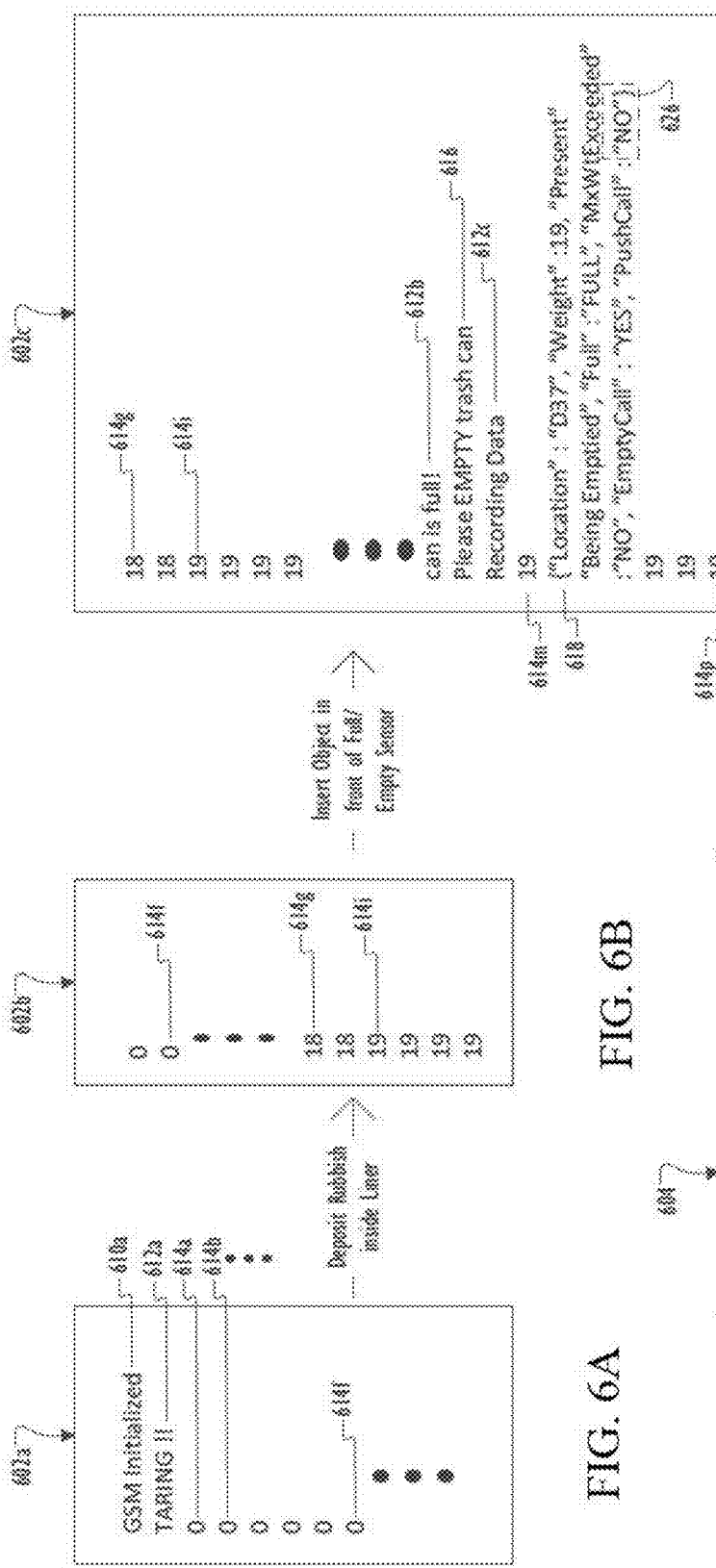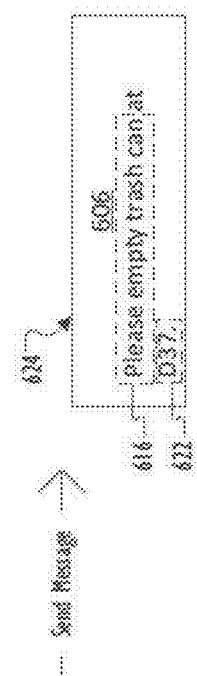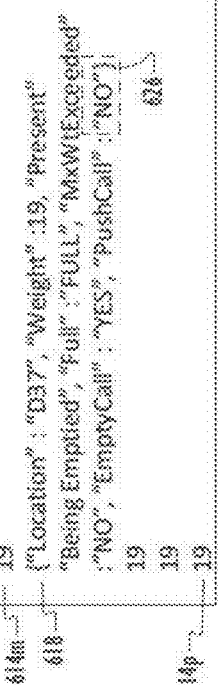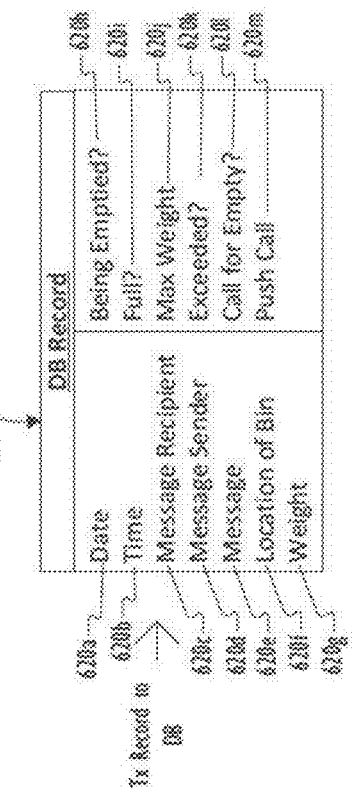

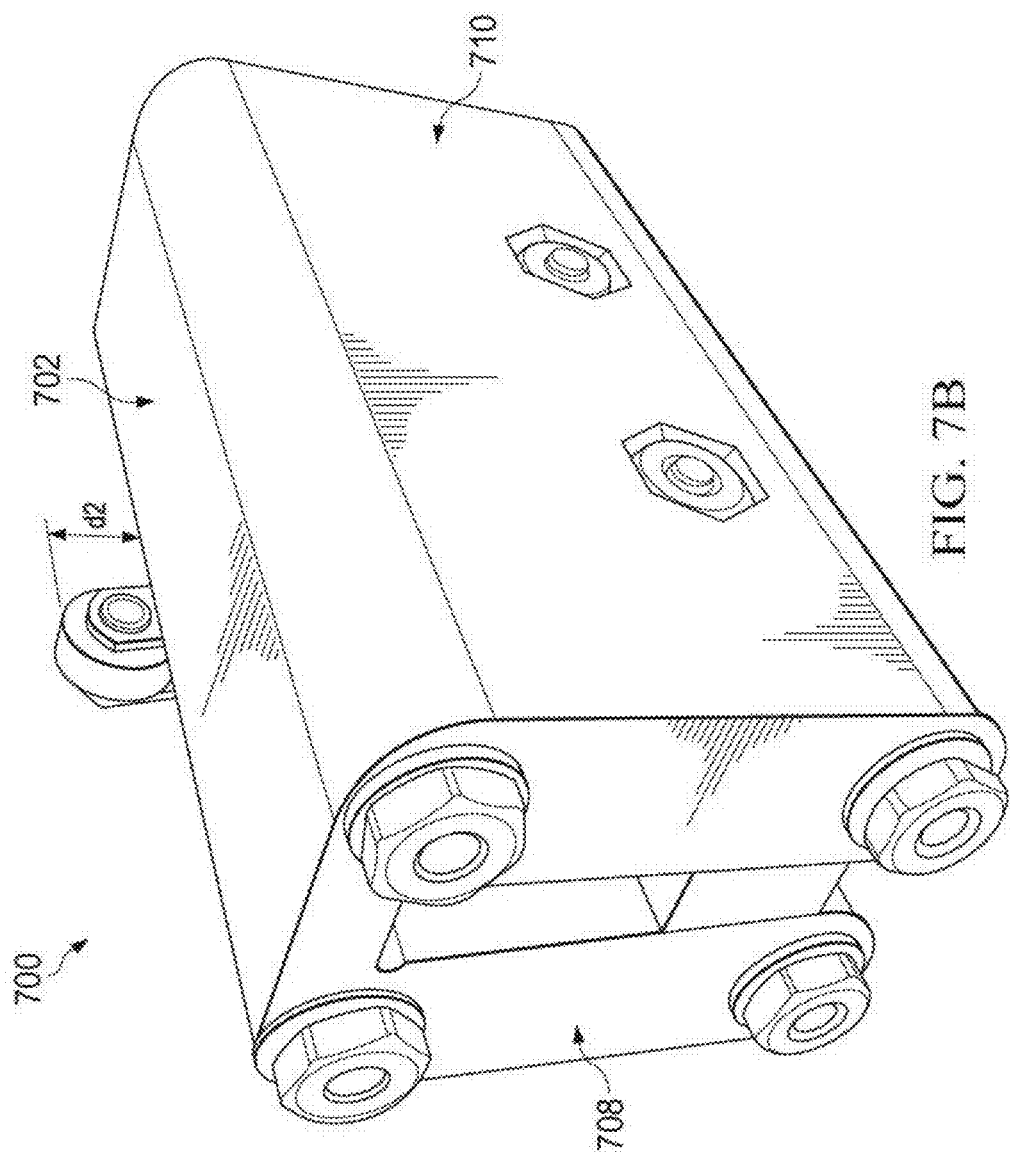

APPARATUS, SYSTEM, AND METHOD FOR GENERATING INTERNET OF THINGS-BASED NOTIFICATIONS AND RECORDS

TECHNICAL FIELD

This disclosure generally relates to IoT-based notifications. More specifically, this disclosure relates to an apparatus, system, and method for generating internet of things-based notifications and records.

BACKGROUND

An enterprise-sized company may own multiple waste disposal receptacles, which may be identical or different from each other. The company may employ janitorial staff to manually check each receptable on a periodic basis, such as hourly, in order to provide a visual inspection and to empty out waste. The company may desire for sanitation system operators to receive electronic notifications indicating that a particular receptacle is full. However, no self-contained system exists to attach to differently designed receptacles and sense when the particular receptacle is full or in need of attention.

SUMMARY

This disclosure provides an apparatus, system, and method for generating internet of things-based notifications and records.

In a first embodiment, a method includes receiving measurements from one or more sensor systems, wherein each of the sensor systems measures characteristic variables of a respective space located proximate to the sensor system and is removably attached to a bin that defines the respective space. The method also includes determining, for each of the respective spaces, whether a measured characteristic variable of the respective space satisfies one or more conditions for generating a maintenance request. For each of the respective spaces, the method further includes: in response to determining a condition is satisfied by a measured characteristic variable of the respective space, generating the maintenance request in association with an identifier of the sensor system, wherein the condition is from among the one or more conditions for generating a maintenance request. For each of the respective spaces, the method includes: transmitting a message to a mobile device, the message including the maintenance request.

In a second embodiment, an electronic device includes a processor and a memory operatively connected to the processor. The memory stores one or more instructions that, when executed by the processor, cause the electronic device to: receive measurements from one or more sensor systems, wherein each of the sensor systems measures characteristic variables of a respective space located proximate to the sensor system and is removably attached to a bin that defines the respective space. The electronic device also includes instructions that cause the electronic device to: determine, for each of the respective spaces, whether a measured characteristic variable of the respective space satisfies one or more conditions for generating a maintenance request. The electronic device also includes instructions that cause the electronic device to: transmit, for each of the respective spaces, a message to a mobile device or email address or other similar method the message including the maintenance request.

In a third embodiment, a sensor system includes a plurality of sensors configured to generate measurements that measure characteristic variables of a space and to removably attach to a bin that defines the space. The sensor system includes at least one master control unit (MCU) configured to communicably couple to the plurality of sensors. The MCU is further configured to transmit the measurements to an external electronic device, which analyzes the measurements to determine whether the measured characteristic variables of the space satisfies one or more conditions for generating a maintenance request associated with an identifier of the sensor system. The maintenance request notifies a user to perform a task to change a characteristic of the space.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which:

FIGS. 6A-6E (together FIG. 6) illustrate example user interfaces, a database, and notification messages associated with Internet of Things-based notifications and records, according to this disclosure;

FIGS. 7A-7E (together FIG. 7) are photographs of various views of a bin-liner sensor attached to the bin of FIG. 2, according to this disclosure;

DETAILED DESCRIPTION

FIGS. 1 through 9, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Embodiments of the present disclosure enable a sanitation system operator at an airport or other facility to dispatch janitorial staff to one or more waste disposal receptacles (also called bins) at different locations. Embodiments of the present disclosure provide an Internet of Things-based notifications and records generating utility that receives measurements from a sensor system that includes a plurality of sensors, each of which is located proximate to a space within the bin so as to measure characteristic variables (e.g., weight, full status, etc.) of the space. The utility generates a schedule of bins to be emptied or visually inspected based on executing various algorithms that determine whether the measurements satisfy conditions for generating a maintenance request. The utility generates a respective schedule for dispatching each of the multiple members of the janitorial staff to various bins in a selected order. The utility transmits the respective schedule in a respective message to a mobile device associated with a respective member of the janitorial staff. The utility generates statistics based on records stored in a database, which enables the sanitation system operator to view information about each of the bins and a collection of multiple bins.

Figure 1:
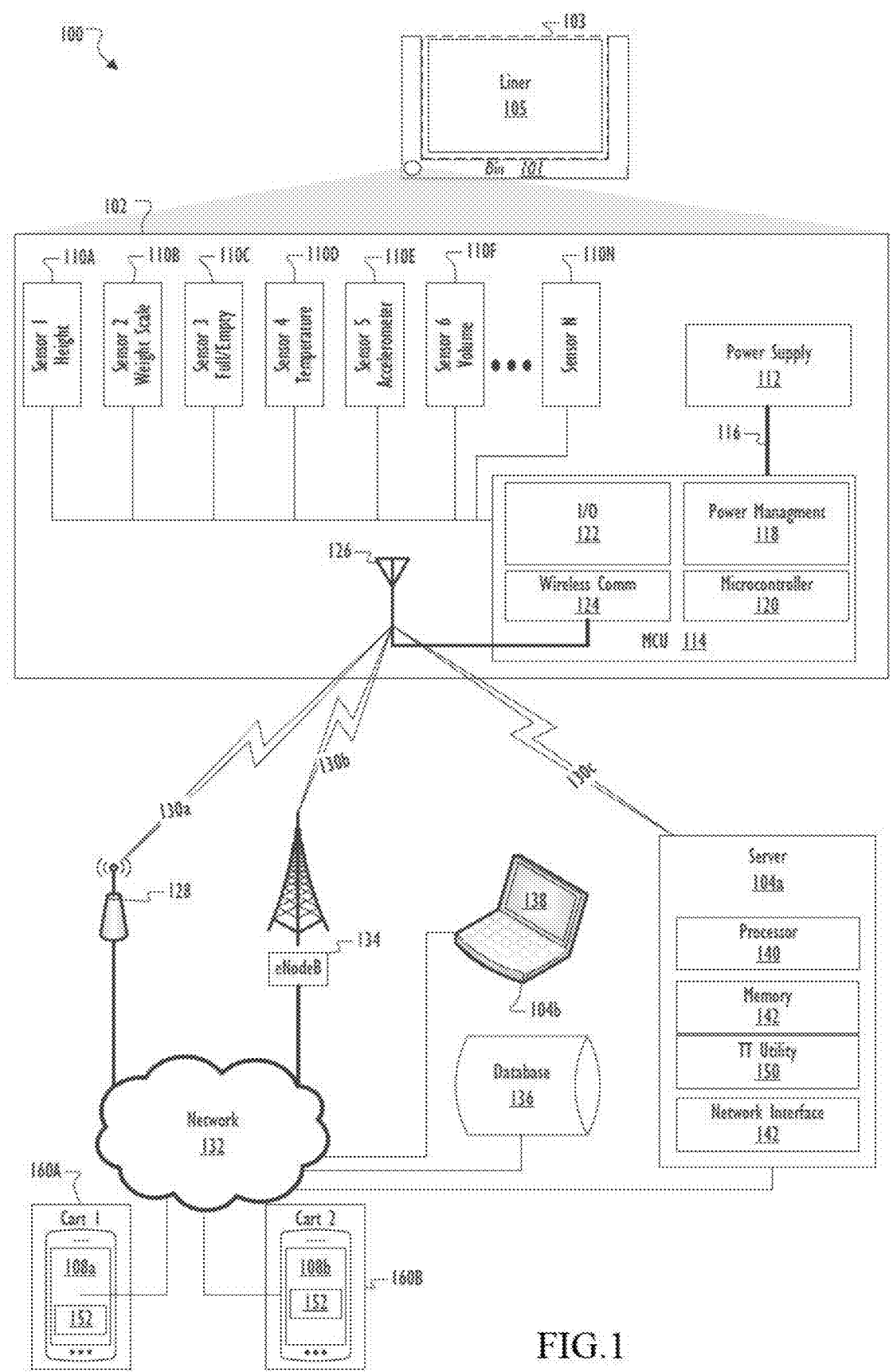
FIG. 1 illustrates an example block diagram of a system that supports generating Internet of Things-based notifications and records, according to this disclosure.
Figure 2:
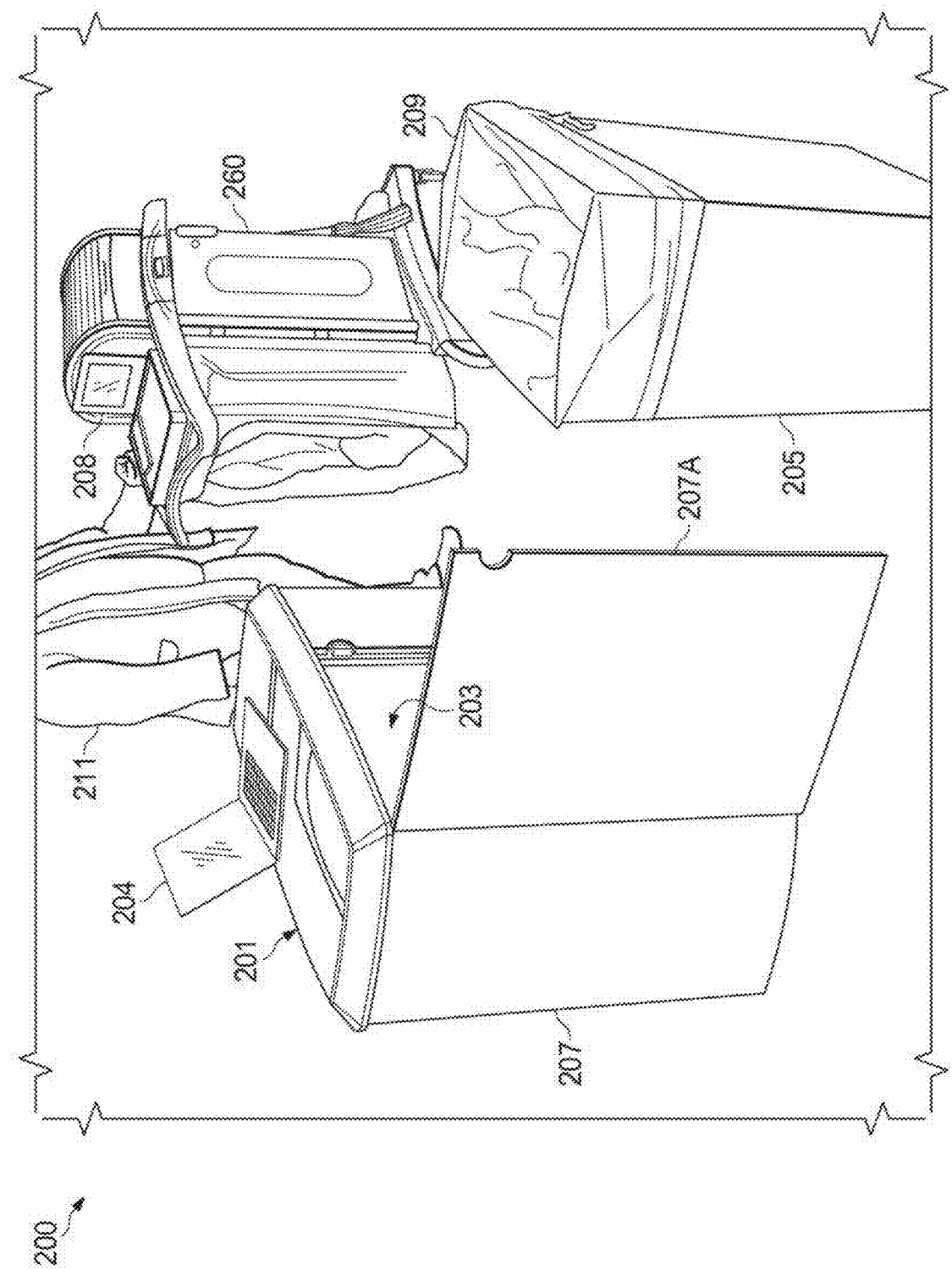
FIG. 2 is a photograph of a three-dimensional example of the system of FIG. 1 with a bin-liner removed from the bin, according to this disclosure.
Figure 3:
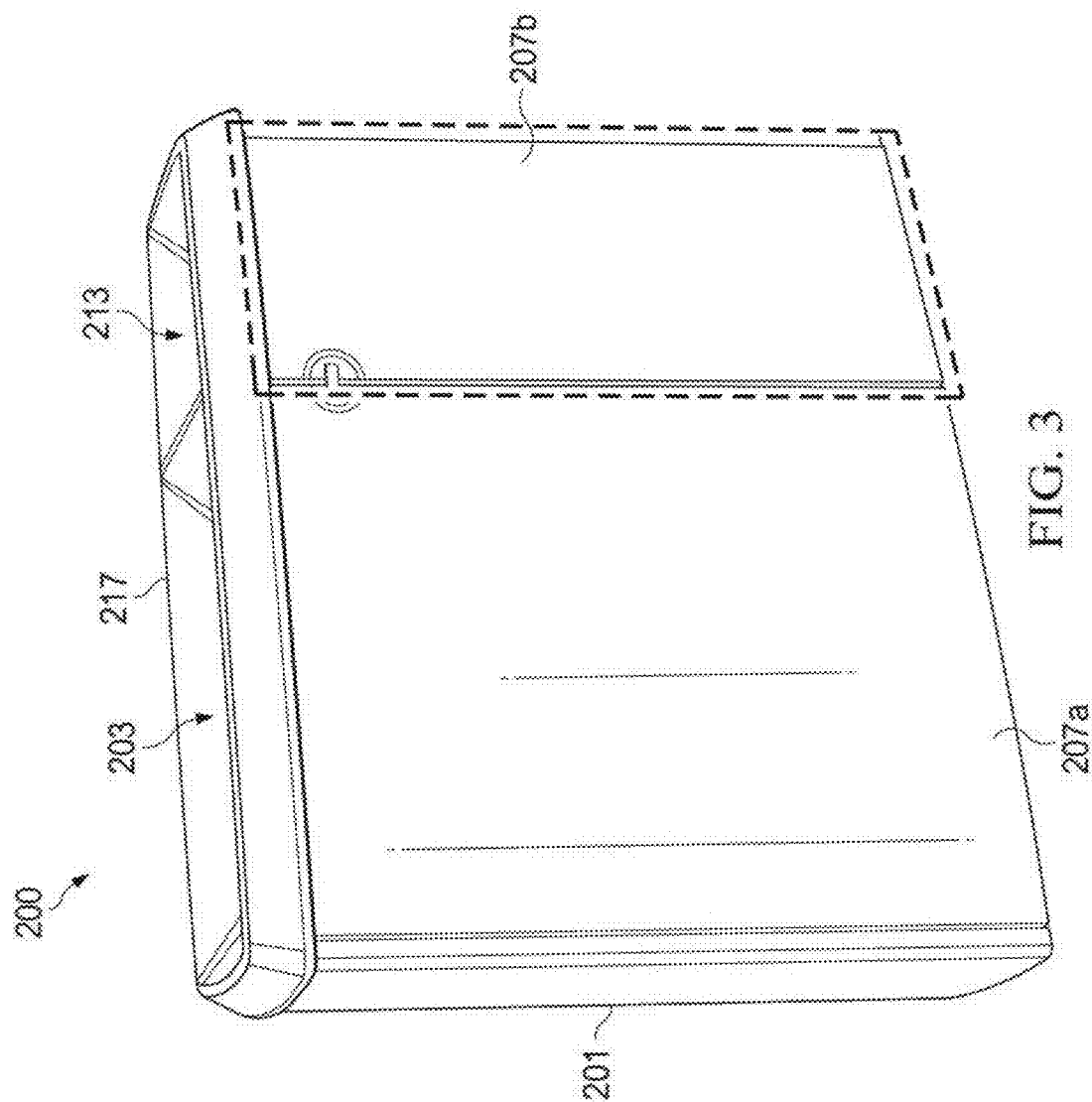
FIG. 3 is a photograph of the example bin containing the bin-liner of FIG. 2, according to this disclosure.
Figure 4:
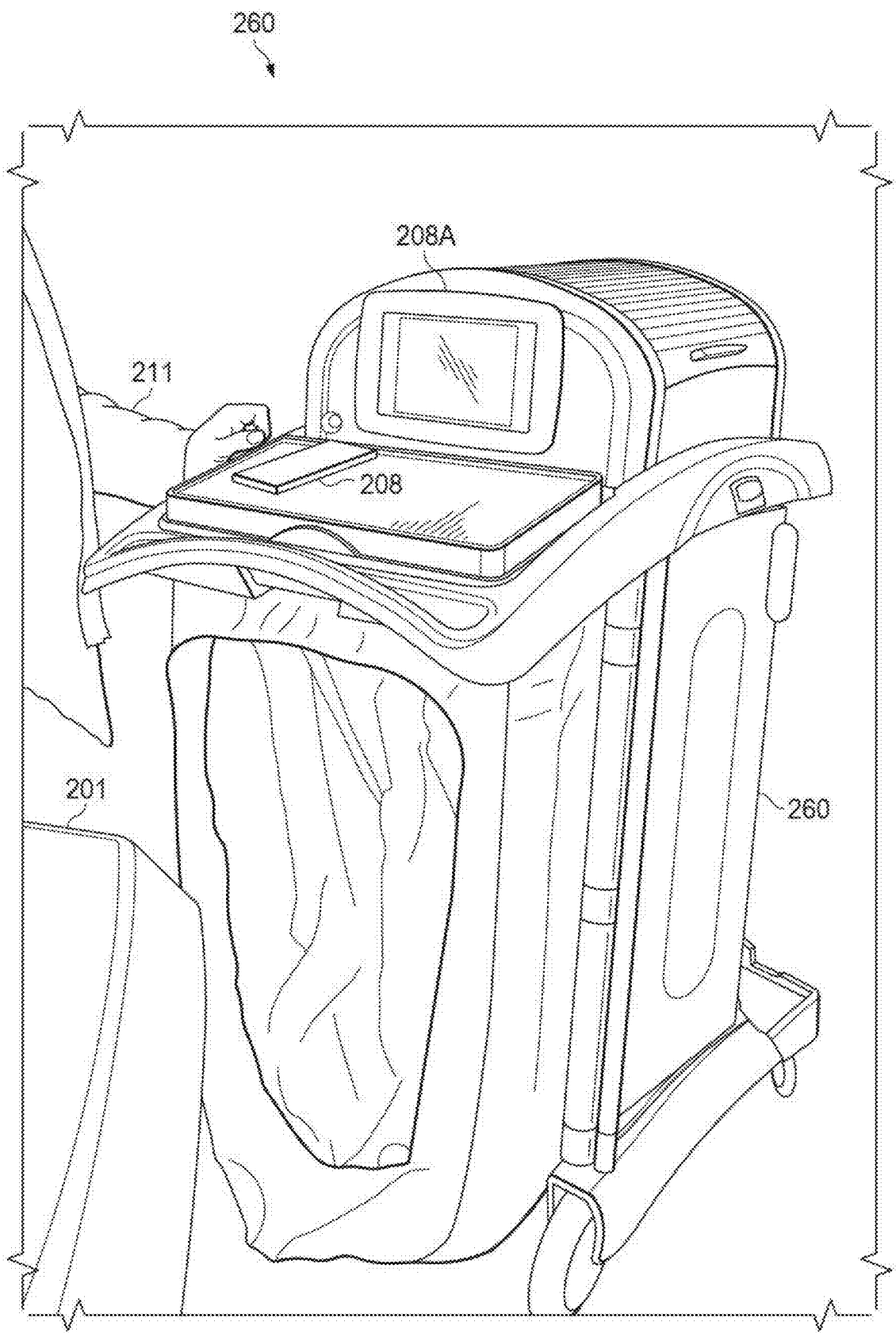
FIG. 4 is a photograph of the example mobile device attached to a janitorial cart of FIG. 2, according to this disclosure.

FIG. 1 illustrates an example block diagram of a system 100 that supports generating Internet of Things-based notifications and records according to this disclosure. FIGS. 2-4 and 7 illustrate one non-limiting example of the system of FIG. 1 in three-dimensional form. Specifically, FIG. 2 is a photograph of a three-dimensional example of the system of FIG. 1 with a bin-liner removed from the bin, according to this disclosure. FIG. 3 is a photograph of the example bin containing the bin-liner of FIG. 2, according to this disclosure. FIG. 4 is a photograph of the example mobile device attached to a janitorial cart of FIG. 2 according to this disclosure.

In this disclosure, for clarity, the block diagram form shown in FIG. 1 will be referred to as the system 100, and the 3D form shown in FIGS. 2-4 and 7 will be referred to as the system 200. While two systems 100 and 200 are shown, it is understood that the components of the system 100 of FIG. 1 can be the same as or similar to the components of the system 200 of FIG. 2. Similarly, it is further understood that the components of one system from among the systems 100 and 200 can be incorporated into the other system and function in the same or similar way. In order to avoid duplicate descriptions, FIG. 1 will be described first, followed by a description of any additional details that are more visible in FIGS. 2-4, and then FIG. 7 will be described further below according to a sequential order of the figures of this disclosure.

The system 100 includes a portable sensor system 102 and an electronic device 104 (such as a server 104a or a laptop 104b or other computing device not shown) communicably coupled to the sensor system 102. The system 100 also includes one or more mobile devices 108 (such as first and second mobile devices 108a-108b), which are communicably coupled to the electronic device 104 via a network 132. In some embodiments, each mobile device 108 is attached to or otherwise associated with a janitorial cart 160 (illustrated as Cart 1 160a and Cart 2 160b). This disclosure describes the system 100 being used in a scenario in which the bin 101 is a receptacle for landfill-bound waste, compostable refuse, or recyclable items. However, it is understood that the bin 101 can be any container that receives matter that needs to be monitored, measured, removed, compacted, or filled. The bin 101 defines a three-dimensional (3D) space 103. For example, the bin 101 may be a container that includes a bottom base defining a bottom of the space 103, and side walls having an interior surface that define sides of the space 103. In some embodiments, the bin 101 has an open bottom, without the bottom base, in which case, the floor underneath the bin 101 defines the bottom of the space 103. In some embodiments, the bin 101 houses at least one interior metal or plastic bin-liner 105 that fits within the space 103. The bin-liner 105 can be removed from the bin 101 and washed. For example, a sidewall of the bin 101 can include a hinged door that opens and closes to allow a janitor to remove the bin-liner 105, to remove any matter contained within the bin-liner 105 (such as a bag filled with matter) and to replace the emptied bin-liner 105 into the space 103. Bin 101 may be used with a separate replaceable bag sometimes called a liner.

The sensor system 102 includes a plurality of sensors 110a-110n, a power supply 112, and a master control unit (MCU) 114 communicably coupled to each other. For ease of illustration, the sensor system 102 is shown as a small circle that is attached to a bin 101, and a zoom-in detailed view of the sensor system 102 is shown as a large block that shows connections between the plurality of sensors 110a-110n, power supply 112, and the MCU 114. The sensor system 102 is self-enclosed, as such, the sensor system 102 can be mounted to multiple bins 101, sequentially. That is, the sensor system 102 can be initially used for monitoring one bin 101 that is a receptacle, and then later unmounted, removed from the receptacle, and mounted to another bin, which may be a different type of bin or may be an identical receptacle.

The plurality of sensors 110a-110n are configured to removably attach to the bin 101. The sensors 110a-110n can be mounted or otherwise attached to various locations of the bin 101 in order to sense phenomena that takes place within the space 103. The plurality of sensors 110a-110n generate measurements that measure characteristic variables of the space 103. Examples of characteristic variables of the space 103 include height of empty space, weight of a mass contained within the space 103, status as being full or empty, temperature, orientation as being upright or fallen, volume occupied by the mass contained within the space 103, global positioning system (GPS) or other geographic location or unoccupied volume.

The sensor system 102 includes a height sensor 110a that generates a distance measurement associated with the space 103, such as a height from a bottom end to a top end of the space 103 ("height of the space 103"), a height of a mass that is contained within the space 103, or a height of empty space. When the space 103 is empty, the distance measurement of the height of empty space is measured between a bottom end and a top end of the space 103. When a mass is contained within the space 103, the height of empty space is measured between the top end of the space 103 and the top end of the mass. Examples of the height sensor 110a include a range-finding sensor, such as a laser or ultrasonic range-finder. The measurements generated by the height sensor 110a enable the sensor system 102 to not only determine binary information of whether the space 103 is full or not full, but also determine more granular information about a level of fullness or emptiness based on heights of the mass and empty space.

The sensor system 102 includes a weight sensor 110b that generates a weight measurement of a mass contained within the space. Examples of the weight sensor 110b include a scale and a strain gauge.

The sensor system 102 includes a full/empty state sensor 110c, which generates a binary output (e.g., value 1) indicating that the space 103 is full or output (e.g., value 0) indicating that the space 103 is not full. An example of the full/empty state sensor 110c is an optical sensor (e.g., "seeing eye" sensor) that generates a measurement indicating whether an optical signal is blocked by a mass contained within the space 103. Reference number 110c interchangeably refers to the full/empty state sensor, generally, and the optical sensor, specifically. Particularly, the optical sensor 110c transmits an optical signal, which when received by an optical receiver, generates a measurement indicating that the full/empty status of the space 103 is not full. Alternatively, the optical sensor 110c generates a measurement indicating that the full/empty status of the space 103 is not full when the optical sensor 110c transmits an optical signal that is incident upon a mass located intermediately between the optical transmitter and the optical receiver, in which case, the mass blocks the optical signal from being received by the optical receiver. The optical sensor 110c detects the interruption of the transmitted optical signal.

These sensors 110a-110n can be used alone or in combination with other sensors and logic (e.g., algorithms executed by the electronic device 104) to determine a false reading of fullness of the space 103. In one embodiment, where a trash bag is being used in the bin 101 or bin-liner 105, fill height data can be corroborated by weight data to determine a false reading of fullness is being sensed when the trash bag is inflated from the air around it causing the trash bag to close in on itself, such as when the height sensor 110a outputs measurements or a full indicator or while the weight sensor 110b output measurements that indicate not-full. This situation would cause the electronic device 104 to determine that the height of matter in the space 103 has reached a full level and/or to record incorrect fill height data if the fill height from the height sensor 110a or full/empty state sensor 110c was used alone. However, if the weight sensor data was below a practical threshold that conflicts with the measurement data from the fill height sensor 110a (or 110c), then logic could be employed by the electronic device 104 to ignore fill height until a threshold weight has been reached or to send a maintenance request for visual inspection. In another embodiment, data analysis of an accumulation of measurements recorded from the various sensors over time could inform the system of a similar false reading of fill height.

The sensor system 102 includes a temperature sensor 110d that senses thermal characteristics of the space 103 and generates temperature measurements. The temperature sensor 110d can be attached to the bin 101 at a location that senses the temperature of food or other matter contained within the bin-liner 105. The temperature sensor 110d can be attached to a power cable 116 that carries electricity to the components of the sensor system 102. In certain embodiments, temperature sensor 110d includes a thermocouple attached to a lithium-ion battery pack of the power supply 112 so that the MCU 114 or the sensor system 102 as a whole shuts down or disconnects from the power supply 112 when the battery pack overheats. In cases the battery pack overheats, the temperature sensor 110d can generate measurements that cause the MCU 114 to output a SOS ("save our souls") message to a system operator, who needs to know about an imminent fire hazard associated with the sensor system 102. In certain embodiments, the sensor system 102 includes multiple temperature sensors attached to the bin 101 at different locations in order to generate measurements associated with the battery pack distinct from measurements associated with another location. The measurements from multiple temperature sensors enable the MCU 114 to determine whether this fire hazard is caused by the battery or another item that was placed in the bin.

The sensor system 102 includes a motion sensor 110e that detects and measures motion of the bin 101 or motion of the bin-liner 105. For example, the motion sensor 110e measures an orientation characteristic as being upright or fallen. The motion sensor 110e includes a gyroscope and/or accelerometer. The gyroscope communicates the angular position of the bin 101 or bin-liner 105, using gravity to help determine orientation. The accelerometer is utilized to measure non-gravitational acceleration and enables controller 120 to determine velocity and other measurements associated with the quantified physical movement of the bin 101 or bin-liner 105.

The sensor system 102 includes a volume sensor 110f that detects and measures the volume occupied by the mass contained within the space 103, or the unoccupied volume of empty space within the space 103. Examples of the volume sensor 110f include the height sensor 110a, or a camera. The camera captures images of the space 103, and digital image processing enables the controller 120 to determine whether the bin-liner 105 is contained or removed from the space 103. The camera can also capture images or detect depth information, which the controller 120 (or processor associated with the camera) analyzes to estimate a ratio of the volume of the space 103 that is empty versus occupied by a mass.

The sensor system 102 can include any number (N) of sensors. For example, the $N^{th}$ sensor can be a position sensor 110n that detects an IN or OUT position of the bin-liner 105 as being contained in the space 103 or removed from the space 103, respectively. When in the OUT position, the position sensor 110n outputs a signal that indicates that the bin-liner 105 is "being emptied." When switching from the OUT position to the IN position, the position sensor 110n outputs a signal that indicates the bin-liner 105 has been inserted into the space, which can be the basis upon which the processor 140 of the electronic device 104 initiates a tare weighing procedure.

The MCU 114 includes a power management module 118 that interfaces with the power cable 116 to receive electric energy from the power supply 112 and to control distribution of power to the components of the sensor system 102. As introduced above, examples of the power supply 112 include a battery, or connection to electrical service of the building (e.g., wall socket power outlet at 120 volts), or a combination of these. The MCU 114 includes a controller 120, an input/output (I/O) interface 122 that connects to the sensors 110a-110n and enables the MCU 114 to receive input and to output data, and a communication module 124 that communicates with external devices, such as the electronic device 104. Example types of the controller 120 include one or more microprocessors, microcontrollers, digital signal processors (DSPs), application specific integrated circuits (ASICs), field programmable gate arrays (FPGAs), or discrete circuitry. In some embodiments, the controller 120 includes a clock that enables messages transmitted from the MCU 114 to include a date and time stamp. In some embodiments, the controller 120 includes limited memory storage, which stores a unique identifier of the sensor system 102, enabling the controller 120 to transmit the unique identifier together with information that is associated with the sensor system 102. For example, measurements generated by the sensors 110a-110n can be transmitted together with the unique identifier of the sensor system 102, enabling the electronic device 104 to identify which sensor system 102 generated the transmitted measurements.

The communications module 124 supports communications with other systems or devices. For example, the communications module 124 can include a network interface card or a wireless transceiver facilitating communications over a wired or wireless network. The communications module 124 may support communications through any suitable physical or wireless communication link(s). The communications module 124 includes one or more antenna(s) 126 that enable wireless communications, such as cellular (e.g., GSM), Long Range (LoRa), WiFi, and the like. For example, the communications module 124 can communicate with an access point 128 over a first wireless communication channel 130a, such as a wireless local area network (LAN) connection. The access point 128 is connected to a network 132 (e.g., the Internet), which enables communication with other network-connected devices, such as an electronic device 104. The communications module 124 can establish a second wireless communication channel 130b with a node 134 (e.g., base station; eNodeB) for cellular communications. The node 134 is connected to the network 132 via a backhaul, which enables communication with other network-connected devices, such as an electronic device 104. In some embodiments, communications module 124 can communicate with the electronic device 104 directly over a third wireless communication channel 130c, without any network, for example using LoRa communication. As another example, the system 100 could include a number M of sensor systems 102, each attached to different bin from among M bins 101 and networked to each other. At least one of the M of sensor systems 102 is a lead sensor system that is connected to the external environment (e.g., network 132) via WiFi, GSM, or other wireless communication protocol and that is connected to the remainder of the M of sensor systems 102 in order to receive their data and transmit their data to the electronic device 104. Compared to the lead sensor system, the remainder of the M of sensor systems 102 may have a communication module 124 that does not directly connect to the network 132, enabling lower power consumption and solar charge of the power supply from ambient indoor (e.g., florescent) light.

At least one electronic device 104 and at least one database 136 are used in the system 100 to support generating Internet of Things-based notifications and records according to this disclosure. The electronic device 104 includes any suitable computing device(s) supporting generating Internet of Things-based notifications and records according to this disclosure. Examples of the electronic device 104 include a server 104a and/or a laptop computer 104b. The laptop 104b includes an electronic display 138 for displaying user interfaces to a user of the laptop. The electronic device 104 can receive the information from one or more sensor systems 102, store the information in the database 136, and optionally make the information available to external devices or systems (such as to sanitation system operators, janitors, or supervisors of janitorial staff). For example, a sanitation system operator may be a user of the laptop computer 104b to access and view information that is stored in the database 136, which information is displayed by the electronic display 138.

In this example, the electronic device 104 includes at least one processing device 140, such as at least one microprocessor, microcontroller, digital signal processor, field programmable gate array, application specific integrated circuit, discrete circuitry, or other processing or control device(s). The electronic device 104 also includes at least one memory 142 for storing and facilitating retrieval of instructions and information used, generated, or collected by the processing device(s) 140. The electronic device 104 includes at least one network interface 144 configured to support communications over at least one network, such as a wired network interface (like an Ethernet interface) or a wireless network interface (like a radio frequency transceiver). Note that multiple electronic devices 104 (for example, multiple servers 104a) could be used to provide various functionality in the system 100. For instance, one or more application servers can be used to execute applications for generating Internet of Things-based notifications and records, and one or more database servers can be used to control access to the database 136.

The database 136 can be used to store information collected by multiple sensor systems (e.g., sensor systems 102a-102f of FIG. 8), such as when each sensor system 102 is located in a different location within a building. The database 136 includes any suitable device(s) for storing and facilitating retrieval and storage of information. In certain embodiments, the database 136 is stored within the memory 142 of the electronic device. In certain embodiments, the database 136 implements a database software application, such as Sheets™ spreadsheet application provided by Google®.

The electronic device 104 includes an Internet of Things-based notifications and records generating utility 150, which executes the method(s) shown in FIG. 9, as described more particularly below. Considering that this disclosure describes an embodiment of a system 100 used in a trash receptacle scenario, the Internet of Things-based notifications and records generating utility 150 is herein referred to as a trash telemetry (TT) utility 150 as a shorten name.

The TT utility 150 may be provided as an application that is optionally located within the memory 142 and executed by the processor 140. Within this embodiment, the processor 140 executes the TT utility 150 to provide the various methods and functions described in this disclosure. The TT utility 150 performs the functions of generating Internet of Things-based notifications and records. It is, however, understood that the processor 140 executes the TT utility 150 to provide the various methods and functions described in this disclosure. For simplicity, the TT utility 150 is illustrated and described as a stand-alone or separate software component, which provides the specific functions and methods described herein. However, in certain embodiments, the TT utility 150 may be a component of, may be combined with, or may be incorporated within an operating system (OS) and/or with one or more applications of the electronic device 104.

As introduced above, the TT utility 150 receives measurements from one or more sensor systems 102. The TT utility 150 is able to calculate height of the mass as being a distance between the bottom end of the space 103 and the top end of a mass contained within the space 103 by subtracting from a predetermined height of the space 103, the distance measurement (received from the height sensor 110a) between a top end of the space 103 and the top end of a mass. The TT utility 150 is able to calculate a net weight of the mass contained within the space 103 by subtracting a first weight measurement (received from the weight sensor 110b) of the bin-liner 105 from a second weight measurement of a total weight of the mass contained within the bin-liner 105 and the bin-liner 105. As introduced above, the TT utility 150 can automatically initiate a tare weighing procedure upon removal of matter from the space 103 or upon replacement of the bin-liner 105 into the space 103. The TT utility 150 is able to distinguish whether there is a fire in the trash can, as distinct from whether the trash can contains hot food. For example, the TT utility 150 can generate and output a fire notification message based on temperature measurements (received from the temperature sensor 110d) that exceed a maximum temperature threshold. In some embodiments, the TT utility 150 provides a TT mobile application 152 (TT app 152) to a one or more mobile devices 108, and then the TT app 152 is stored within the mobile device 108 and executed by a processor associated with the mobile devices 108. The TT utility 150 is able to generate Internet of Things-based notifications and records, to transmit messages containing the Internet of Things-based logs of inputs and notifications to the mobile device 108, and to provide Internet of Things-based records to the database 136 for storage. Additional aspects of the TT utility 150, and functionality thereof, are presented within the description of FIGS. 2-9.

Although FIG. 1 illustrates one example of a system 100, various changes may be made to FIG. 1. For example, various components in FIG. 1 may be combined, further subdivided, replicated, omitted, or rearranged and additional components may be added according to particular needs. Also, FIG. 1 illustrates one example type of the sensor system 102 configured to mount on the bin 101. However, this functionality may be used in any other suitable device or system, such as the sensor system 102 can be configured to mount on an ice box, a soap dispenser, or animal feeders for use in a different industry.

As shown in FIG. 2, a rotatable door 207a forms a sidewall 207 of the bin 201. The door 207a is in an open position, and the bin-liner 205 is removed from the space 203. A bag 209 has been placed inside of the bin-liner 205, and the bag 209 is empty and ready for collecting matter. For example, a janitor 211 may have previously removed a bag, which was filled with matter, from the bin-liner 205 and put the full bag into the janitorial cart 260. As an example, a sanitation system operator may use the laptop 204 (e.g., to the laptop computer 104b of FIG. 1) to test the sensor system 102 (hidden from view) installed within the space 203.

As shown in FIG. 3, the rotatable door 207a is closed. The bin 201 can include multiple spaces 203 and 213, including one space 203 that is designated for receiving landfill-bound waste and enclosed by the door 207a, and including a second space 213 (hidden from view) that is designated for receiving recyclable items and enclosed by a similar door 207b, which is also closed. For ease of explanation, the second space 213 is illustrated as a block with a perimeter of broken lines. The bin 201 include a lid 217 that covers the top ends of the multiple spaces 203 and 213. The lid 217 includes an opening through which a person (e.g., a passenger at the airport) inserts landfill-bound waste into the space 203, and another opening through which the person inserts recyclable items into the space 213.

As shown in FIG. 3, a first mobile device 208a (e.g., a tablet) is attached to the janitorial cart 260, and another mobile device 208 (e.g., a smartphone) is lying on the cart 260. As an example, the janitor 211 may concurrently use the first mobile device 208a and the other mobile device 208 to receive messages containing maintenance requests via the TT app 152. The other mobile device 208 can be used by the janitor 211 to redundantly perform the same functions associated with the TT app 152 that are performed by the first mobile device 208a.

Figure 5B:
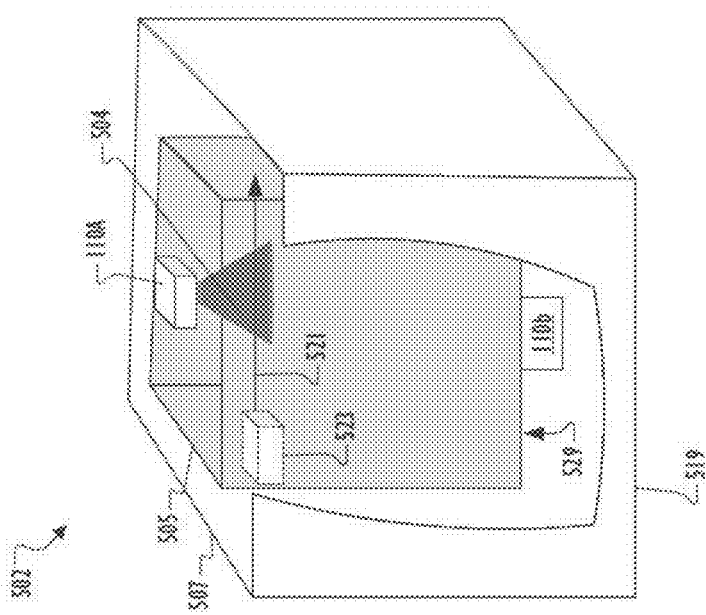
FIGS. 5A and 5B (together FIG. 5) illustrate a cross-section view and a front perspective cutout view of an example sensor system mounted to a bin, according to this disclosure.
Figure 5A:
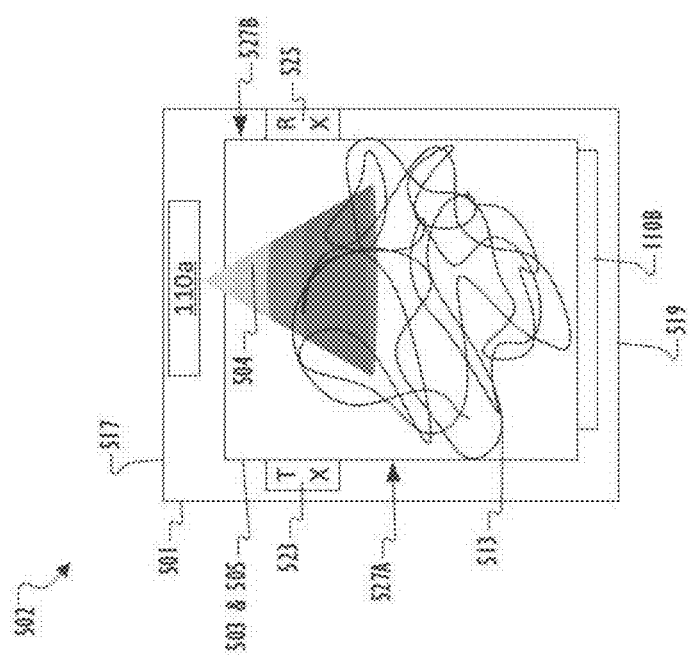

FIG. 5A illustrates a cross-section view of an example sensor system 502 mounted to a bin, according to this disclosure. FIG. 5B illustrates a front perspective cutout view of the sensor system 502 mounted to a bin, according to this disclosure. For simplicity, FIGS. 5A and 5B are together referred to as FIG. 5. The bin 501 can be the same as or similar to the bins 101 and 201 of FIGS. 1 and 2, and components of the bin 501, such as the lid 517, can be components of the bins 101 and 201 of FIGS. 1 and 2. In some embodiments, the bin-liner 505 is a rigid structure that defines the boundaries of the space 503, and in such cases, the sidewalls 527a-527b and the bottom base 529 of the bin-liner 505 form the side and bottom boundaries of the space 503.

The sensor system 502 of FIG. 5 may, for example, be used as the sensor system 102 in the bin 101 of FIG. 1 or be used as the sensor system 102 in the bin 201 of FIG. 2. Note, however, that the sensor system 502 of FIG. 5 may be used with any other suitable device and in any other suitable system. In this example, the sensor system 502 generates measurements by detecting phenomena within the space 503 within the interior of the bin 501.

The sensor system 502 includes the height sensor 110a, which includes both a transmitter that transmits signals 504 and a receiver that receives reflected signals based on the transmitted signals 504. The height sensor 110a is mounted to an interior surface of the lid 517, and the signals 504 are directed toward the bottom of the bin-liner 505. When the signals 504 are incident upon the matter 513 (e.g., one or more objects) that is contained in the space 503, the height sensor 110a generates distance measurements of the height of empty space, which is less than a predetermined height of the space 503. That is, the reflected signals off the top surface of the matter 513 travel back to the receiver of the height sensor 110a a shorter distance than the predetermined height of the space. The predetermined height of the space 503 can be a previously stored distance measurement from the transmitter of the height sensor 110a to the bottom base 529 of the bin-liner 505. As shown in FIG. 5B, the bin-liner 505 can be made of an opaque material such that the matter 513 is hidden from view when the door 207a (FIG. 2) is open, as similarly shown by the cutout view.

The sensor system 502 includes the weight sensor 110b, which is mounted to the base 519 of the bin 501 in order to measure the weight of any objects, including the matter 513 and/or the bin-liner 505, inserted into the interior of the bin. The base 519 is a rigid frame that not only provides structural support to the bin, but also supports the weight of the bin-liner 505 that is inserted into the interior of the bin 501.

The sensor system 502 includes the full/empty state sensor 110c, which is mounted proximate an upper portion of the bin 501 in order to detect whether matter 513 interrupts (e.g., blocks) a signal 521 that is transmitted from a transmitter (Tx) 523 to a receiver (Rx) 525. That is, the full/empty state sensor 110c includes the transmitter 523 and the receiver 525. In some embodiments, the signal 521 can define the boundary of the top of the space 503, which may be the same level as the top of the bin 501 or may be located at a vertical level slightly above or below the top of the bin 501. The signal 521 can be a narrow width beam such that the signal can be interrupted only by matter 513 that is extends through the area that is the top of the space 503. It is understood that the width of the signal 521 is not limited to only the area that is the top level of the space 503 and can be wider in some embodiments. The transmitter 523, as shown in FIG. 5B, is a 3D object that is hidden from view (illustrated by broken lines) when the bin-liner 505 is contain inside the bin 501. The transmitter 523 is mounted to a sidewall of the bin 501 such that that right side of the transmitter 523 faces the exterior surface of the left sidewall of the bin-liner 505. The left side of the transmitter 523 faces the interior surface of the right sidewall 507 of the bin 501.

FIG. 6 illustrates example user interfaces, a database, and notification message associated with Internet of Things-based notifications and records, according to this disclosure. Particularly, FIGS. 6A-6C illustrate various screenshots 602a-602c of a user interface 602 that is displayed by the electronic display 138. FIG. 6D illustrates an Internet of Things-based record 604 that is recorded into the database 136. FIG. 6E illustrates an Internet of Things-based notification message 606 that is transmitted to a mobile device 108 for display to a user (e.g., janitorial staff) interacting with the TT app 152.

As shown in FIG. 6A, the user interface 602 displays logs of inputs that the electronic device 104 receives from the sensor system 102. The logs of inputs are displayed chronologically according to the order in which the input was received. When the sensor system 102 initially powers ON, the wireless communication module 124 enters an initialization state and establishes a wireless communication channel 130 for transmitting outputs to the electronic device 104 and/or the database 136. The log of the "GSM Initialized" input 610a indicates that the sensor system 102 established the second wireless communication channel 130b using GSM cellular technology.

The user interface 602 also displays logs of the current state of the electronic device 104 or the current state of the sensor system 102. For example, the log of the "TARING!!" state 612a indicates the current state of performing tare weighing procedure, which can be performed by the MCU 114 or the electronic device 104. In performance of the tare weighing procedure, the electronic device 104 receives inputs including multiple weight measurements 614 generated by the weight sensor 110b. In performance of the tare weighing procedure, the MCU 114 or the electronic device 104 receive measurements of and assign a negligible value (e.g., zero "0" value) to the weight of the empty bin-liner 105, as shown by the weight measurements 614a-614f.

As shown in FIG. 6B (and continuing in FIG. 6C), once the tare weighing procedure is complete, the electronic device 104 receives weight measurements 614g-614p that indicate the weight of the matter 513 contained inside the bin-liner 105. As the matter 513 increases in weight, the value of the weight measurements increases, for example, from 18 pounds to 19 pounds.

As shown in FIG. 6C, the log of the "can is full!" state 612b indicates the current state of the sensor system 102 as being a full state. In some embodiments, the full state is a state in which the full/empty state sensor 110c outputs measurements indicating that the matter 513 (or any other object) has interrupted or has been interrupting the signal 521 for a predetermined period of time (e.g., threshold duration of blockage). In some embodiments, the full state is a state in which the weight measurements 614 output from the weight sensor 110b exceed a maximum weight threshold (for example, >20 pounds).

The electronic device 104 determines that the full/empty state (i.e., a measured characteristic variable) of the space 103 satisfies the condition of being in a full state (i.e., a condition for generating a maintenance request) based on based on the full state measurement output form the full/empty state sensor 110c. In response to determining the current, full state of the space 103 satisfies the condition for generating a maintenance request, the electronic device 104 generates a maintenance request 616 ("Please EMPTY trash can") and records an Internet of Things-based record 604 (FIG. 6D) in the database 136.

The user interface 602 displays of log of the recording state 612c ("Recording Data") of the electronic device 104 and the database 136. The user interface 602 displays of log of the recorded information 618.

As shown in FIG. 6D, the Internet of Things-based record 604 includes multiple fields 620a-620m respectively: Date of record creation; Time of record creation; Message Recipient; Message Sender; Maintenance Request Message; Identifier of the sensor system ("Location of Bin"); Weight; Bin-Liner Present/Being Emptied state ("Being Emptied?"); Full/Empty state ("Full?"); Max Weight threshold; Maximum Weight Exceeded state ("Exceeded?"); Maintenance Request Generated ("Call for Empty"); Notification Message Transmitted ("Push Call"). The record 604 corresponding to the log of recorded information 618 (FIG. 6C) includes the following values in the corresponding fields 620:

"D37" value 622 stored in the Identifier of the sensor system field 620f;

"19" value stored in the Weight field 620g;

"Present" value stored in the Bin Present/Being Emptied state field 620h;

"Full" value stored in the Full/Empty state field 620i;

"NO" value stored in the Maximum Weight Exceeded state field 620k;

"YES" value stored in the Maintenance Request Generated field 620l; and

"NO" 626 revalue stored in the Notification Message Transmitted field 620m.

As shown in FIG. 6E, the electronic device 104 transmits a message 606 to a mobile device 108, and in response, the TT app 152 displays the message 606 in a user interface 624 output by electronic display associated with the mobile device 108. The message 606 includes the maintenance request 616 in associated with the identifier 622 of the sensor system 102. The maintenance request 616 is the value (e.g., "Please EMPTY trash can") stored in the Maintenance Request Message field 620e. The maintenance request 616 can be in a verbal format (e.g., textual) that can be read by a human user, who may understand that the maintenance request 616 notifies the user to perform a task to change a characteristic of a space, a bin, or a bin-liner. The identifier 622 of the sensor system 102 is the obtained from the "D37" value 622 stored in the Identifier of the sensor system field 620f (FIG. 6D).

FIG. 7 shows photographs of various views of a bin-liner sensor 700 attached to the bin 201 of FIG. 2, according to this disclosure. FIGS. 7A-7C show various views of the bin-liner sensor 700 placed on top a flat surface, and FIGS. 7D-7E show the bin-liner sensor 700 installed in or mounted to the bottom base (519) of the bin 201. FIG. 7A shows a perspective view of the top 702, front 704, and right side 706 of the bin-liner sensor 700. FIG. 7B shows a perspective view of the top 702, back 708, and left side 710 of the bin-liner sensor 700. FIG. 7C shows a view of the back 708 of the bin-liner sensor 700.

As shown in FIG. 7, the bin-liner sensor 700 detects a bin-liner present/absent characteristic of the space 203, namely detecting whether the bin-liner 205 is present within or removed from the space 203. The bin-liner sensor 700 can be a position switch that switches between a bin-liner-in position and a bin-liner-out position. In the bin-liner-in position, the bin-liner sensor 700 outputs measurements indicating the bin-liner 205 is present, namely, contained within the space 203. In the bin-liner-out position, the bin-liner sensor 700 outputs measurements indicating the bin-liner 205 is absent, namely, removed from the space 203.

Figure 7A:
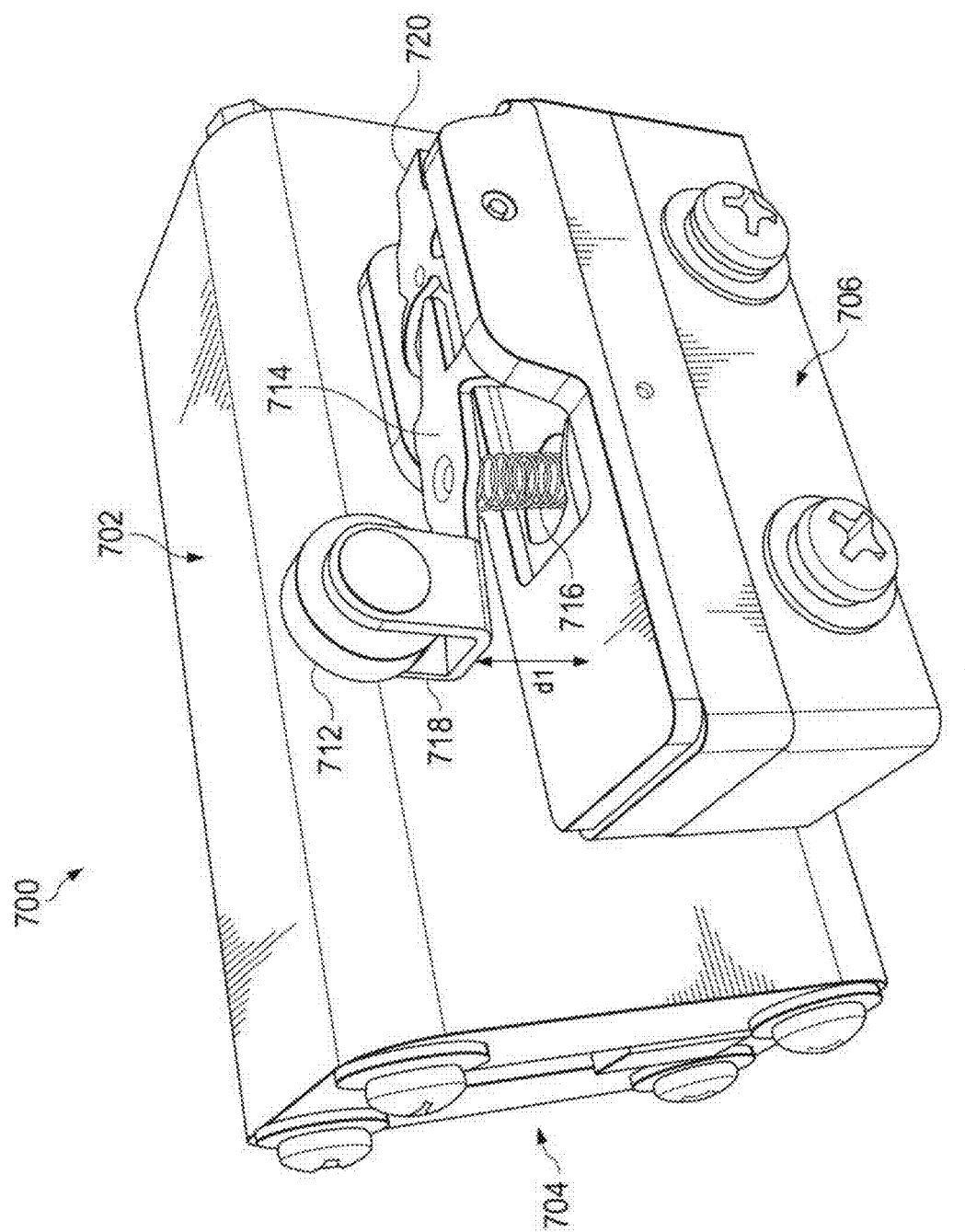

As shown in FIG. 7A, the position switch includes a lever 714, a roller 712 attached to a first end 718 of the lever (which is opposite the pivot end 720 of the lever), and a spring 716 that is attached to and pushes up on a central portion of the lever such that the first end 718 of the lever is suspended upward by distance d1. As shown in FIG. 7B, the roller 712 is positioned at a distance d2 above the top 702 of the bin-liner sensor 700 when no weight presses down on the roller 712 of the position switch. When no weight presses down on the roller 712 of the position switch, the spring 716 is expanded out from the recessed hole and outputs a signal (e.g., zero value) indicating the bin-liner 205 is absent. However, the weight of the bin-liner 205 pressing down on the roller 712 causes the spring 716 to compress down into a recessed hole, and causes the lever 714 to tilt about the pivot end 720 such that the first end 718 is lower by a distance (such as distance d1). When the spring 716 is compressed down into recessed hole, the position switch is in the bin-liner-in position, which causes the sensor 700 generate and output a signal (also referred to as measurements of the bin-liner present/absent characteristic) (e.g., value of one (1)) indicating the bin-liner 205 is present. When the bin-liner 205 is being inserted into or removed from the space 203, the exterior surface of the bottom base (529) of the bin-liner 205 may slide along the interior surface of the bottom base (519) of the bin 201 and may also roll over the roller 712.

Figure 7C:
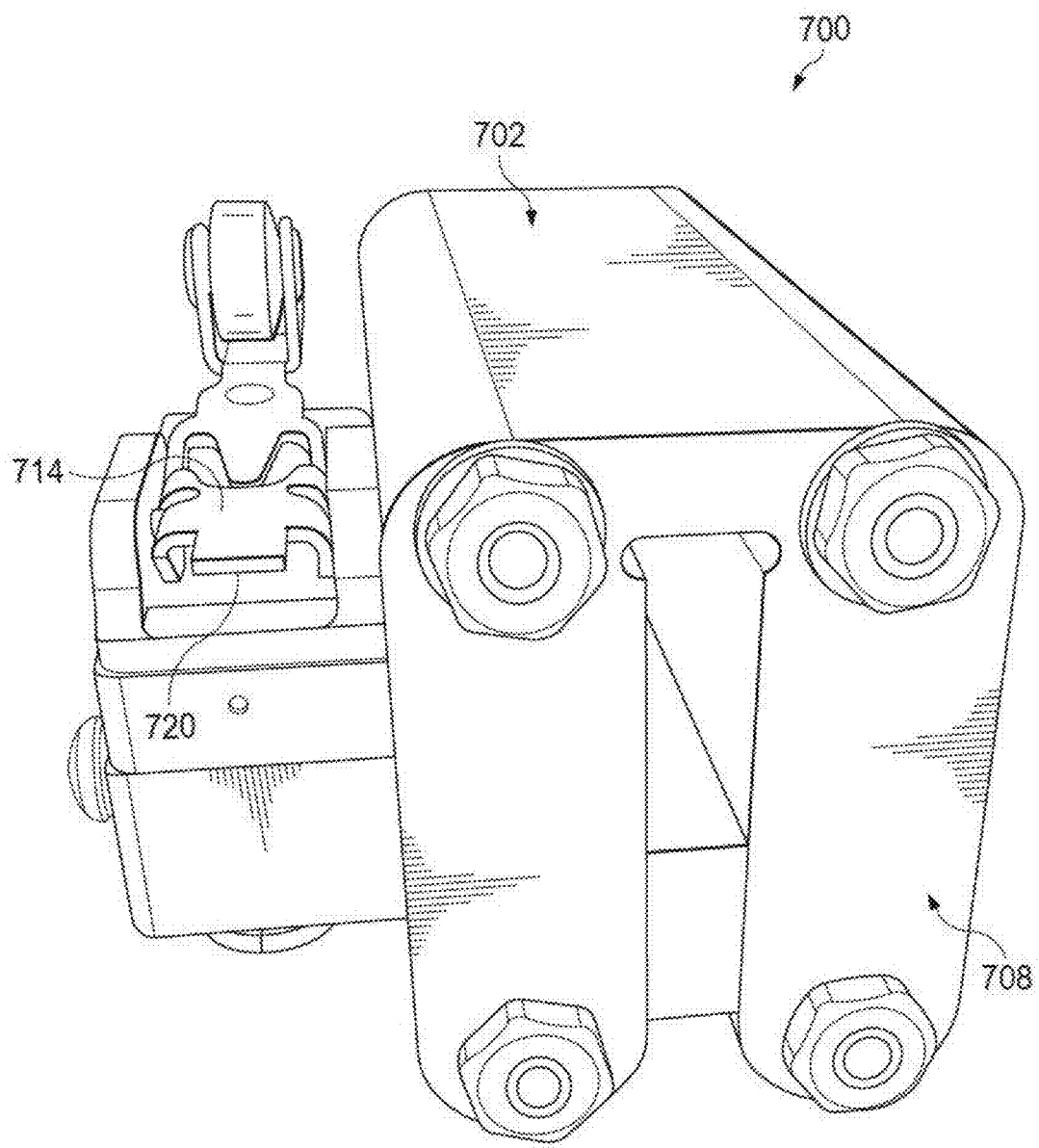
Figure 7D:
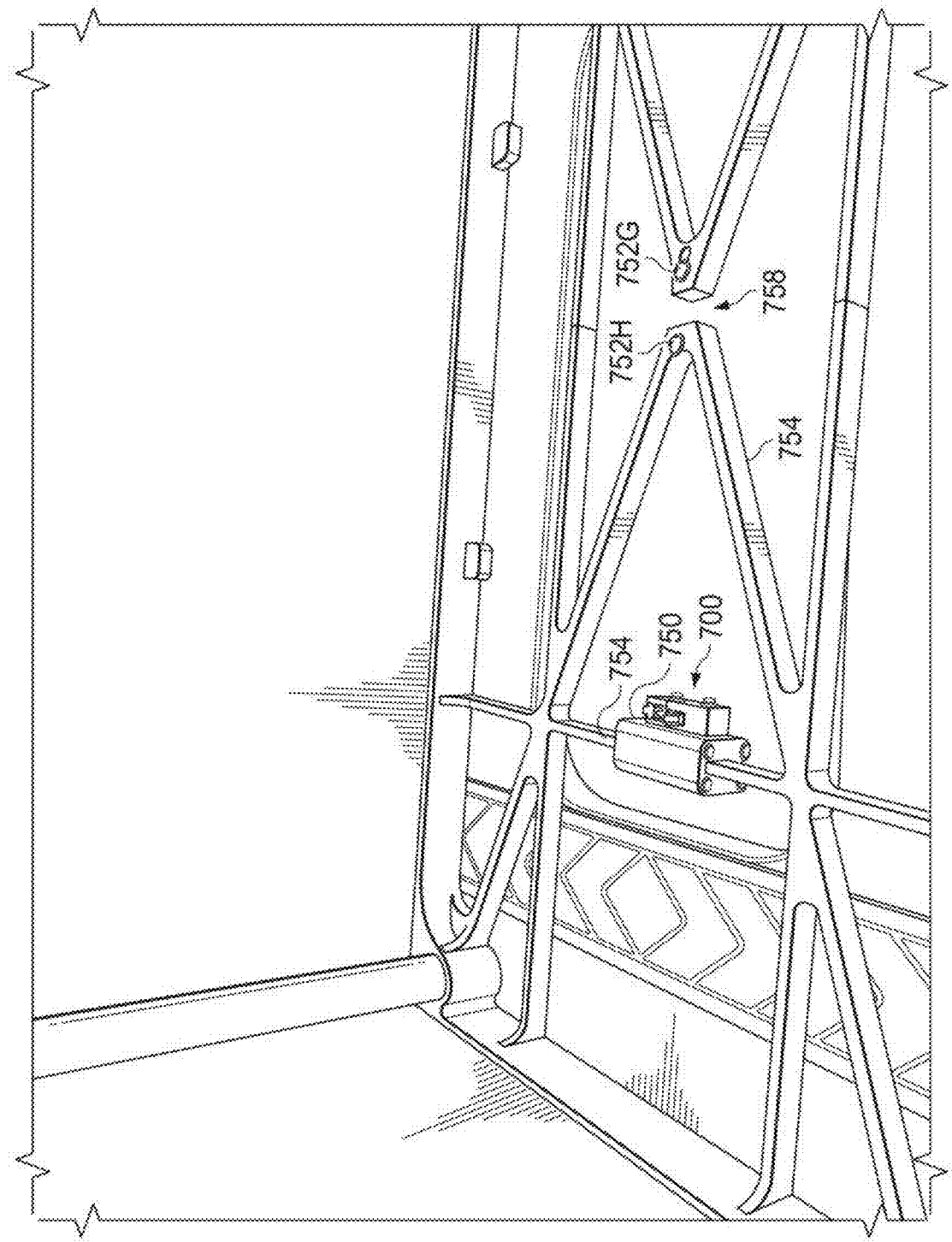
Figure 7E:
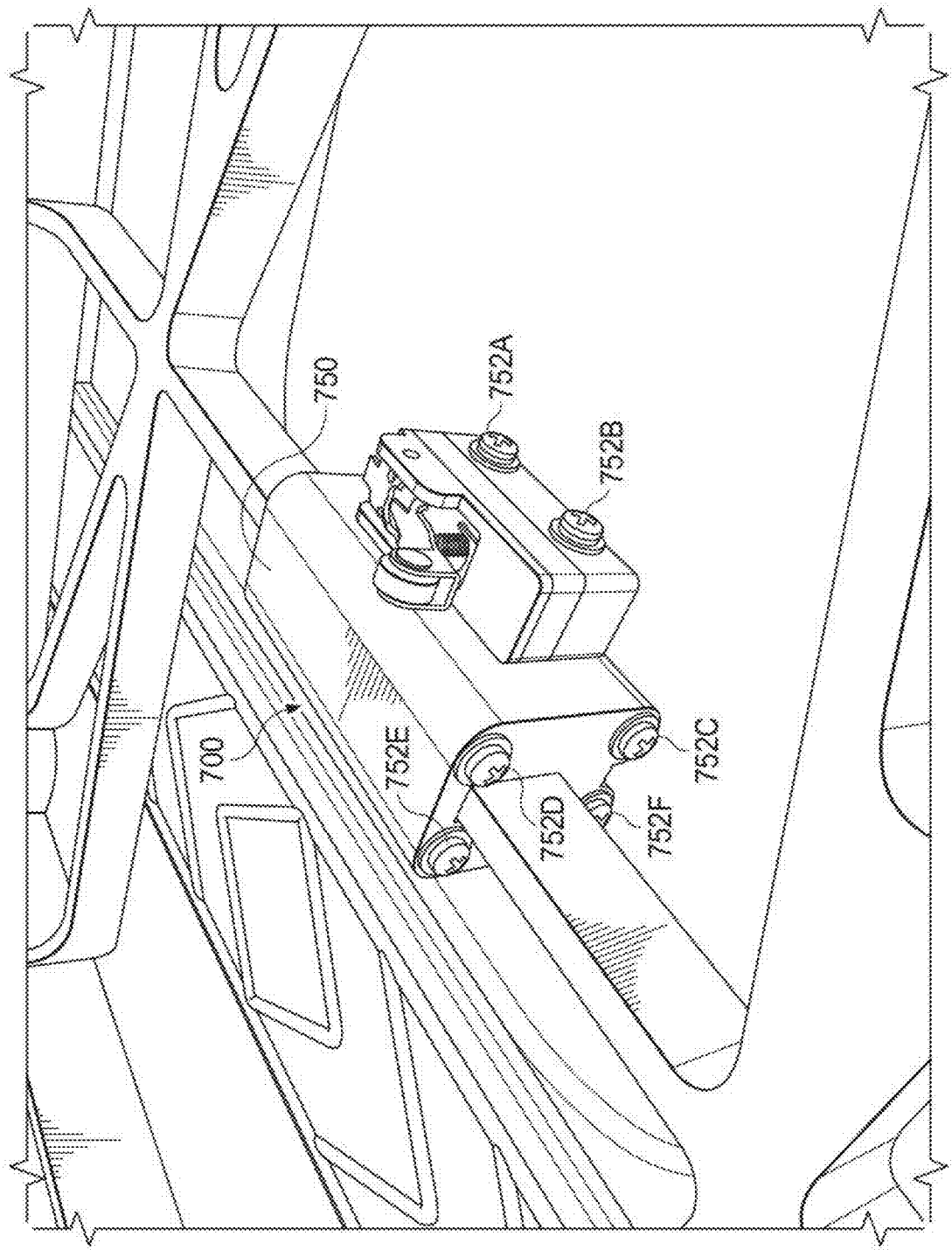

As shown in FIGS. 7C and 7D, the bin-liner sensor 700 includes a mounting unit 750 to which the position switch is attached by mechanical fasteners 752a-752b. The mounting unit 750 mounts to a frame member 754 of the bottom base (such as 519 of FIGS. 5A-5B) of the bin 201. For example, the mounting unit 750 includes a hole through which the frame member 754 extends. The mounting unit 750 can be made using additive manufacturing to custom fit the frame member 754. The mechanical fasteners 752c-752f extend longitudinally through four corner regions of the mounting unit 750 in order to apply compression to the 3D-printed layers.

In at least some embodiments, the bottom base (519) of the bin 201 includes frame members 756a-756b that are configured to connect to a weight sensor 110b (such as a strain gauge) using mechanical fasteners 752g-752h. The space 758 between the frame members 756a-756b provides a location for installing the weight sensor 110b.

Figure 8:
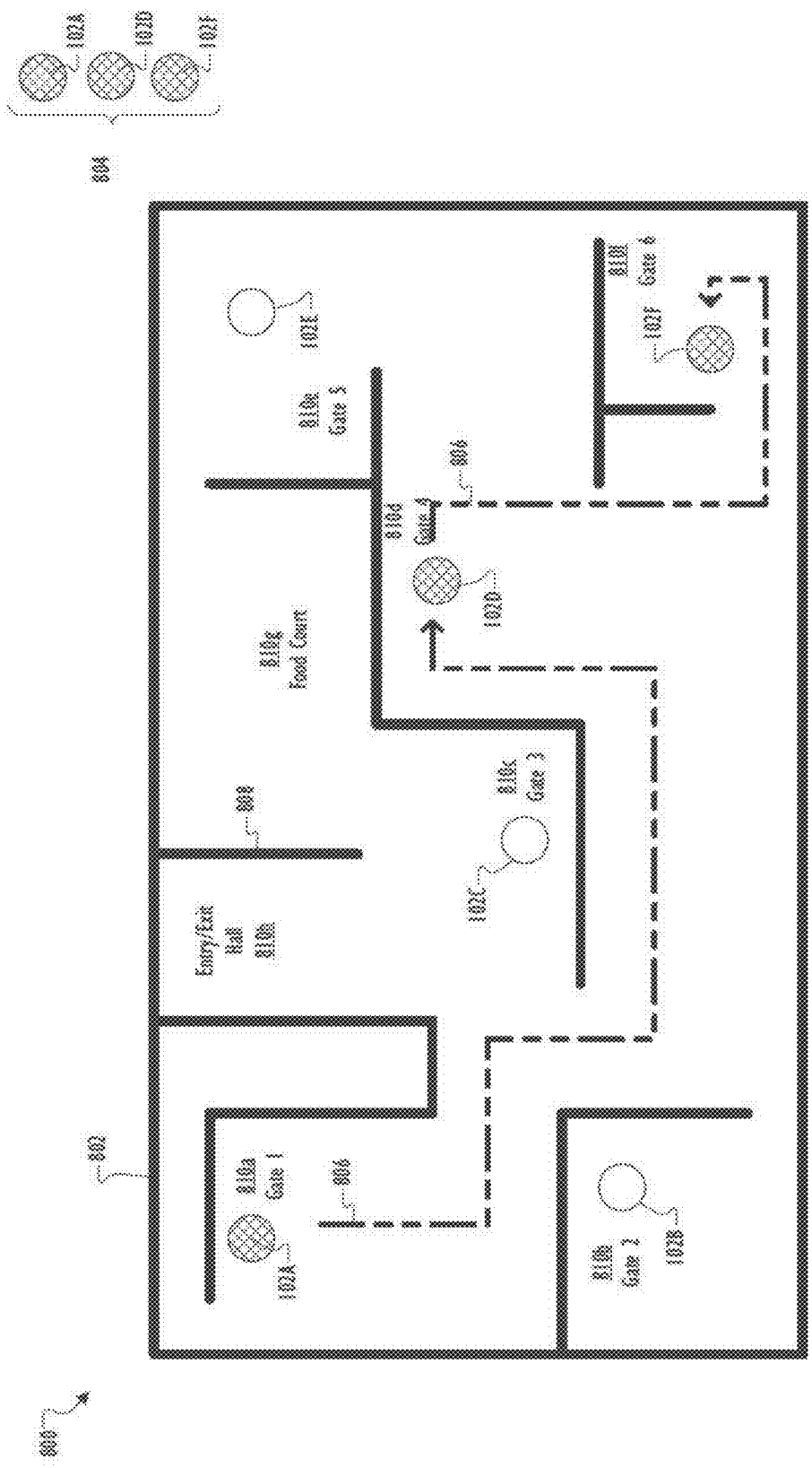
FIG. 8 illustrates an example map that illustrates a location of multiple sensor systems within a floorplan of a building, according to this disclosure.

FIG. 8 illustrates an example map 800 that illustrates locations of multiple sensor systems 102a-102f within a floorplan of a building 802, according to this disclosure. The electronic device 104 transmits the map 800 to a mobile device 108 to show the locations of multiple sensor systems 102a-102f. In some embodiments, the message 606 includes the map 800. In some embodiments, the TT app 152 presents a user interface 624 that enables the mobile device 108 to selectively retrieve and view the map 800 from a server 104a.

In some embodiments, the message 606 includes a list 804 of multiple maintenance requests associated with respective sensor systems 102a, 102d, and 102f that satisfied one or more conditions for generating a maintenance request. The list 804 can be the listed sensor systems 102a, 102d, and 102f shown on the map 800 with indicators (shown as circles with hash marks) that show a janitorial staff where to empty (i.e., remove matter 513 from) bin-liners 205.

In some embodiments, the message 606 specifies a sequential order in which the bin-liners 205 are to be emptied. For example, the message 606 can include a directional path 806 that starts at the bin-liner 205 associated with a first sensor system 102a that is located in the area 810a of Gate 1. Second, the directional path 806 includes an arrow that leads the janitorial staff to next empty the bin-liner 205 associated with a fourth sensor system 102d that is located in the area 810d of Gate 4. Last, the directional path 806 includes a second arrow that leads the janitorial staff to next empty the bin-liner 205 associated with a sixth sensor system 102f that is located in the area 810f of Gate 6.

It is understood that the TT utility 150 generates the message, map 800, list 804, and directional path 806. In certain embodiments, the TT utility 150 generates the list 804 to include sensor systems 102 that have not been emptied in the past hour (or other period of time for visual inspection of the bins 101). In certain embodiments, the TT utility 150 generates the directional path 806 to avoid high foot-traffic areas, such as the entry/exit hall 810h. In certain embodiments, the TT utility 150 generates the directional path 806 to minimize footsteps or minimize travel time between the areas 810a, 810d, and 810f where the janitorial staff is supposed to perform a maintenance task (e.g., emptying the bin-liner, changing the orientation characteristic of a fallen bin by standing it upright). In certain embodiments, the TT utility 150 generates the directional path 806 to start at the sensor system 102 having the lightest weight and to proceed to sensor systems in order of ascending weight measurements in order to minimize the weight of the cart 160 pushed over long distances.

In the example shown, the building 802 has a rectangular shape with four exterior walls, and the building 802 can represent a terminal of an airport. The floorplan of the building 802 includes various interior walls 808 that separate different areas 810 (including airport waiting areas 810a-810f surrounding Gates 1-6 and other areas 810g-810h) on the same floor level of the building.

Although FIG. 8 illustrates one example of a map 800, various changes may be made to FIG. 8. For example, various components in FIG. 8 may be rearranged and additional components may be added according to particular needs. As a particular example, the map 800 could include a multi-level building 802 with multiple floorplans.

Figure 9:
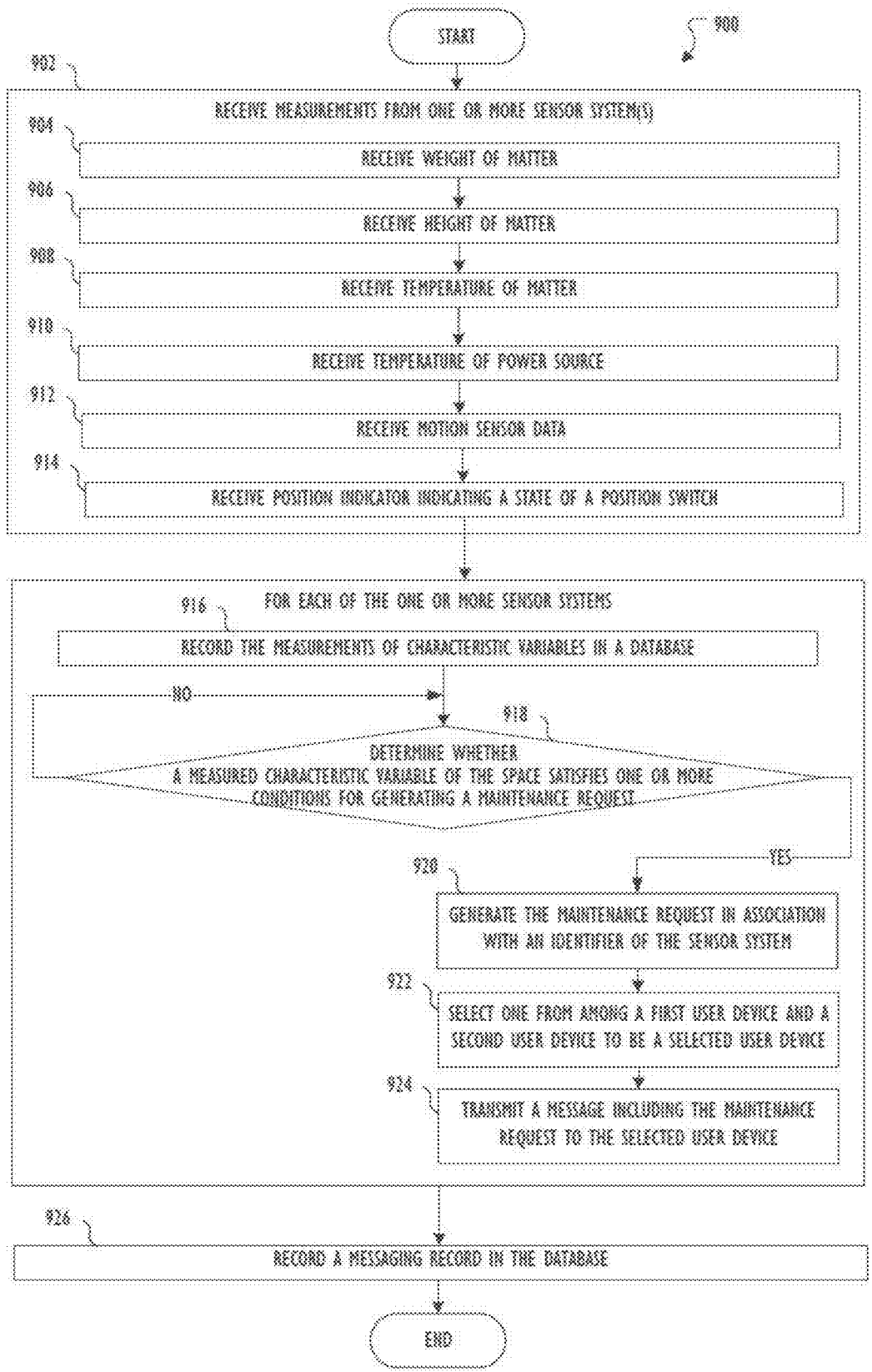
FIG. 9 illustrates an example method for generating Internet of Things-based notifications and records, according to this disclosure.

FIG. 9 illustrates an example method 900 for generating Internet of Things-based notifications and records, according to this disclosure. For ease of explanation, the method 900 is described as involving the use of the TT utility 150 executed by the processor 140 of FIG. 1, which may be used within the system 100 of FIG. 1. However, the method 900 may involve the use of any other suitable device in any other suitable system.

As shown in FIG. 9, the method 900 can begin at the start block and proceed to block 902, in which the processor 140 receives measurements from one or more one sensor systems 102a-102f. Each of the sensor systems 102 measures characteristic variables of a respective space 103 located proximate to the sensor system. For example, receiving the measurements from a sensor system 102 includes: receiving (at block 904) measurements of the weight of matter 513 contained within the space from weight sensor 110b; receiving (at block 906) distance measurements of the height of the matter contained within the space from the height sensor 110a; receiving (at block 908) measurements of temperature of the matter 513 from the temperature sensor 110d; receiving (at block 910) measurements of the temperature of the power supply 112 from temperature sensor 110d; receiving (at block 912) measurements of motion characteristics of the bin 101 from the motion sensor 110e; and receiving (at block 914) position indicator indicating a bin-liner present/absent characteristic of the space 103 from a bin-liner sensor 700. Each of the sensor systems 102 is removably attached to a bin 101. In some embodiments the respective space 103 is defined by a bin 101 or is defined by a bin-liner 105.

For each of the one or more sensor systems 102a-102f that transmit inputs to the electronic device 104, the method 900 includes blocks 916-924. At block 916, the processor 140 records a record 604 in the database 136. Recording the record 604 in the database 136 includes: recording (at block 916) the measurements of at least some of the characteristic variables. The record 604 relates the identifier 622 of the sensor system to the measurements of at least some of the characteristic variables.

At block 918, the processor 140 determines whether a measured characteristic variable of the respective space satisfies one or more conditions for generating a maintenance request. In response to determining that the measured characteristic variables of the respective space 103 does not satisfy any of the one or more conditions for generating a maintenance request, the method 900 returns or remains at block 918 and in parallel, continues to receive measurements from the plurality of sensors 110a-110n of the sensor system 102. Determining whether a condition is satisfied may also include recording or updating the record 604 that relates the identifier 622 of the sensor system to: for each of the one or more conditions for generating a maintenance request, a value indicating whether the condition is satisfied.

As an example, a condition for generating a maintenance request includes the condition of the space 103 having a currently full state. For each of the respective spaces 103, the processor 140 may determine whether an empty/full state of the space satisfies the condition based on at least one of: a comparison of a threshold weight to a weight measurement of a mass contained within the space, or a measurement indicating that an optical sensor signal is blocked by the matter 513. The processor 140 may determine whether an empty/full state of the space satisfies the condition based on a comparison of a distance threshold to a distance measurement between a bottom end of the space and one of: a top end of a mass contained within the space or a top end of the space.

As another example, a condition for generating a maintenance request includes a first condition of the space 103 having a bin-liner absent characteristic in combination with a second condition of the motion sensor indicating the bin 102 has fallen. In this example, the processor 140 determines whether multiple measured characteristic variables satisfy a multi-part condition (e.g., the combination of multiple conditions) for generating a maintenance request. For each of the respective spaces 103, the processor 140 determines that the space 103 has a bin-liner absent characteristic based on determining a matter 513 (such as the bin-liner 105) is being removed from the space 103, in response to detecting a bin-liner sensor 700 switched from a bin-liner-in position to a bin-liner-out position. Additionally, the processor 140 determines the space has a fallen characteristic in response to receiving measurements form the motion sensor that indicate the bin 101 is not upright.

If yes, at block 920, in response to determining a condition, from among the one or more conditions for generating a maintenance request, is satisfied by a measured characteristic variable of the respective space, that processor 140 generates the maintenance request 616 in association with an identifier 622 of the sensor system. In some embodiments, generating the maintenance request 616 in association with an identifier 622 of the sensor system further includes recording a new record or updating an existing record such that the record 604 relates the identifier 622 of the sensor system to the maintenance request 616 (e.g., the value stored in the Maintenance Request Message field 620d).

At block 922, the processor 140 selects one mobile device 108 from among the first mobile device 108a and the second mobile device 108b as the selected mobile device, wherein the selected mobile device will receive the maintenance request generated at block 920. By selecting one of the mobile devices 108a-108b, the processor 140 also selects one user from among multiple users (e.g., janitorial staff members) registered to use the mobile devices 108a-108b. For example, the selected mobile device may be selected based on being associated with a user who is currently at work, as indicated by the mobile device having a current location in the building 802 as well as recently receiving user inputs to the mobile device. The selected mobile device may be selected based on evenly distributing the maintenance requests among the mobile devices 108a-108b, or based on assigning maintenance requests to the mobile device located closest to the location of the sensor system 102. In some embodiments, selecting the selected mobile device 108 further includes recording a new or updating an existing record 604 that relates the identifier 622 of the sensor system to the selected mobile device, which is stored in Message Recipient field 620c.

At block 924, the processor 140 transmits a message 606 to a mobile device, such as the selected mobile device (selected at block 922). The transmitted message 606 includes the maintenance request (generated at block 920). In some embodiments, transmitting the message to the mobile device includes: transmitting a first message 606 to a first mobile device 108a and transmitting a second message 606 to the selected mobile device (for example, mobile device 108b). The first message includes the maintenance request associated with the identifier of the first sensor system 102a, and the second message includes the maintenance request associated with the identifier of the second sensor system 102b.

At block 926, the processor 140 records or updates a record 604 (such as a messaging record) that relates the identifier 622 of the sensor system to a message transmission value 626 (e.g., the value stored in the Notification Message Transmitted field 620m) indicating the message was transmitted.

Although FIG. 9 illustrates one example of a method 900 for generating Internet of Things-based notifications and records, various changes may be made to FIG. 9. For example, while shown as a series of steps, various steps in FIG. 9 may overlap, occur in parallel, occur in a different order, or occur any number of times. As a particular example, the block 902 may include continuously receiving inputs and measurements from sensor systems 102a-102f and block 916 may include iteratively recording records into the database 136, which blocks 902 and 916 may generally operate in parallel, and their associated steps may therefore be performed in parallel.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
receiving, by a network interface, measurements from one or more sensor systems, wherein each of the one or more sensor systems measures characteristic variables of a respective space located proximate to the sensor system and is removably attached to a bin that defines the respective space; and
for each of the one or more respective spaces:
determining, by at least one processor, whether a measured characteristic variable of the respective space satisfies one or more conditions for generating a maintenance request;
in response to detecting a bin-liner switch switched from a bin-liner-in position to a bin-liner-out position, determining that a bin-liner is being removed from the respective space, wherein the bin-liner switch comprises a lever configured to switch to the bin-liner-in position when the bin contains the bin-liner in the respective space and switch to the bin-liner-out position when the bin does not contain the bin-liner in the respective space based on tilt movement of the lever;
in response to determining that a condition, from among the one or more conditions for generating the maintenance request, is satisfied by the measured characteristic variable of the respective space, generating, by the at least one processor, the maintenance request in association with an identifier of a corresponding sensor system among the one or more sensor systems, wherein the corresponding sensor system includes the bin-liner switch;
selecting a mobile device, from among multiple mobile devices registered to multiple users, based on the selected mobile device being associated with a user currently in a building associated with the one or more sensor systems; and
transmitting, by the network interface, a message to the selected mobile device, the message including the maintenance request that notifies the user of the mobile device to perform a task to change the characteristic variable of the respective space,
wherein selecting the mobile device comprises selecting the user of the selected mobile device from among multiple users registered as being selectable to be notified based on currently being in the building.

2. The method of claim 1, wherein the message includes a map that illustrates a location of the corresponding sensor system within a floorplan of the building.

3. The method of claim 1, wherein:
the one or more sensor systems include a first sensor system located proximate to a first space and a second sensor system located proximate to a second s pace that does not overlap the first space;
transmitting the message to the selected mobile device comprises:
transmitting a first message to a first mobile device, wherein the first message includes the maintenance request associated with the identifier of the first sensor system; and
transmitting a second message to the selected mobile device, wherein the second message includes the maintenance request associated with the identifier of the second sensor system; and
the selected mobile device is selected from the first mobile device and a second mobile device included in the multiple mobile devices.

4. The method of claim 3, further comprising:
selecting one from among the first mobile device and the second mobile device as the selected mobile device based on the selected mobile device recently receiving user inputs from the user.

5. The method of claim 1, further comprising:
determining, for each of the one or more respective spaces, an empty/full state of the space based on at least one of:
a comparison of a threshold weight to a weight measurement of a mass contained within the space,
a measurement indicating that an optical sensor signal is unblocked/blocked by the mass, and
a comparison of a distance threshold to a distance measurement between a bottom end of the space and one of:

a top end of the mass contained within the space; or
a top end of the space; and
generating the maintenance request based on the empty/full state of the space being a full state.

6. The method of claim 1, further comprising, for each of the one or more respective spaces:
determining that the space has the bin-liner absent characteristic, in response to detecting the bin-liner switch switched from the bin-liner-in position to the bin-liner-out position; and
determining a condition for generating the maintenance request is satisfied based on detecting the bin-liner switch switched from the bin-liner-in position to the bin-liner-out position.

7. The method of claim 1, further comprising:
recording, in a database, a record that relates the identifier of the corresponding sensor system to each of:
a location of the corresponding sensor system within the building;
the measurements of at least some of the characteristic variables;
for each of the one or more conditions for generating the maintenance request, a value indicating whether the condition is satisfied; and
a message transmission value indicating whether the message was transmitted.

8. The method of claim 1, wherein at least one of the one or more sensor systems includes a scale that measures a weight characteristic of a mass contained in the respective space.

9. The method of claim 1, wherein at least one of the one or more sensor systems includes a transceiver that measures a level of volume characteristic of a mass contained in the respective space.

10. An electronic device comprising:
at least one processor; and
at least one memory operatively connected to the at least one processor, wherein the at least one memory stores instructions that, when executed by the at least one processor, cause the electronic device to:
receive measurements from one or more sensor systems, wherein each of the one or more sensor systems measures characteristic variables of a respective space located proximate to the sensor system and is removably attached to a bin that defines the respective space; and
for each of the one or more respective spaces:
determine whether a measured characteristic variable of the respective space satisfies one or more conditions for generating a maintenance request;
in response to detecting a bin-liner switch switched from a bin-liner-in position to a bin-liner-out position, determine that a bin-liner is being removed from the respective space, wherein the bin-liner switch comprises a lever configured to switch to the bin-liner-in position when the bin contains the bin-liner in the respective space and switch to the bin-liner-out position when the bin does not contain the bin-liner in the respective space based on tilt movement of the lever;
in response to determining that a condition, from among the one or more conditions for generating the maintenance request, is satisfied by the measured characteristic variable of the respective space, generate the maintenance request in association with an identifier of a corresponding sensor system among the one or more sensor systems, wherein the corresponding sensor system includes the bin-liner switch;
select a mobile device, from among multiple mobile devices registered to multiple users, based on the selected mobile device being associated with a user currently in a building associated with the one or more sensor systems; and
transmit a message to the selected mobile device, the message including the maintenance request that notifies the user of the mobile device to perform a task to change the characteristic variable of the respective space,
wherein the instructions that when executed cause the electronic device to select the mobile device comprise instructions that when executed cause the electronic device to select the user of the selected mobile device from among multiple users registered as being selectable to be notified based on currently being in the building.

11. The electronic device of claim 10, wherein the message includes a map that illustrates a location of the corresponding sensor system within a floorplan of the building.

12. The electronic device of claim 10, wherein:
the one or more sensor systems include a first sensor system located proximate to a first space and a second sensor system located proximate to a second space that does not overlap the first space;
the instructions that when executed cause the electronic device to transmit the message to the selected mobile device comprise instructions that when executed cause the electronic device to:
transmit a first message to a first mobile device, wherein the first message includes the maintenance request associated with the identifier of the first sensor system; and
transmit a second message to the selected mobile device, wherein the second message includes the maintenance request associated with the identifier of the second sensor system; and
the selected mobile device is selected from the first mobile device and a second mobile device included in the multiple mobile devices based on the selected mobile device recently receiving user inputs from the user.

13. The electronic device of claim 10, wherein the instructions, when executed by the at least one processor, further cause the electronic device to:
determine, for each of the one or more respective spaces, an empty/full state of the space based on at least one of:
a comparison of a threshold weight to a weight measurement of a mass contained within the space,
a measurement indicating that an optical sensor signal is unblocked/blocked by the mass, and
a comparison of a distance threshold to a distance measurement between a bottom end of the space and one of:
a top end of the mass contained within the space; or
a top end of the space; and
generate the maintenance request based on the empty/full state of the space being a full state.

14. The electronic device of claim 10, wherein the instructions, when executed by the at least one processor, further cause the electronic device to, for each of the one or more respective spaces:

determine that the space has the bin-liner absent characteristic in response to detecting the bin-liner switch switched from the bin-liner-in position to the bin-liner-out position; and determine a condition for generating the maintenance request is satisfied based on detecting the bin-liner switch switched from the bin-liner-in position to the bin-liner-out position.

15. The electronic device of claim 10, wherein the instructions, when executed by the at least one processor, further cause the electronic device to:

record, in a database, a record that relates the identifier of the corresponding sensor system to each of:
- a location of the corresponding sensor system within the building;
- the measurements of at least some of the characteristic variables;
- for each of the one or more conditions for generating the maintenance request, a value indicating whether the condition is satisfied; and
- a message transmission value indicating whether the message was transmitted.

16. A sensor system comprising:

a plurality of sensors configured to generate measurements that measure characteristic variables of a space and to removably attach to a bin that defines the space, wherein the plurality of sensors includes a bin-liner switch configured to measure a bin-liner present/absent characteristic of the space and generate a signal in a bin-liner-out position; and at least one master control unit (MCU) configured to:
communicably couple to the plurality of sensors;
in response to detecting the bin-liner switch switched from a bin-liner-in position to the bin-liner-out position, determine that a bin-liner is being removed from the space, wherein the bin-liner switch comprises a lever configured to switch to the bin-liner-in position when the bin contains the bin-liner in the respective space and switch to the bin-liner-out position when the bin does not contain the bin-liner in the respective space based on tilt movement of the lever; and transmit the measurements to an external electronic device configured to analyze the measurements to determine whether the measured characteristic variables of the space satisfy one or more conditions for generating a maintenance request associated with an identifier of the sensor system;

wherein the maintenance request notifies a user to perform a task to change a characteristic of the space, the user registered with a mobile device selected from among multiple mobile devices registered to multiple users based on the selected mobile device being associated with the user currently in a building associated with the sensor system; and wherein the mobile device is selected based on selection of a selected user from among multiple users registered as being selectable to be notified based on currently being in the building.

17. The sensor system of claim 16, wherein the plurality of sensors comprises a scale configured to generate a weight measurement of a mass contained within the space.

18. The sensor system of claim 16, wherein the plurality of sensors comprises an optical sensor configured to generate a measurement indicating whether an optical signal is blocked by a mass contained within the space.

19. The sensor system of claim 16, wherein the plurality of sensors comprises a range-finding sensor configured to generate a distance measurement between a bottom end of the space and one of:
- a top end of a mass contained within the space or
- a top end of the space.

* * * * *